United States Patent [19]
Ito

[11] Patent Number: 6,007,012
[45] Date of Patent: *Dec. 28, 1999

[54] FISHING REEL HAVING A REVERSAL PREVENTATIVE MECHANISM

[75] Inventor: Yukio Ito, Tokyo, Japan

[73] Assignee: Daiwa Seiko, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,522

[22] Filed: Jan. 6, 1998

[30] Foreign Application Priority Data

Jan. 8, 1997 [JP] Japan .................................. 9-001513

[51] Int. Cl.$^6$ .................................................. A01K 89/02
[52] U.S. Cl. ........................................... 242/247; 242/299
[58] Field of Search ................... 242/247, 248, 242/296, 297, 298, 299, 301

[56] References Cited

U.S. PATENT DOCUMENTS

| | | | |
|---|---|---|---|
| 4,288,146 | 9/1981 | Morimoto et al. | 242/299 X |
| 4,923,141 | 5/1990 | Sazaki et al. | 242/247 |
| 5,178,343 | 1/1993 | Sato | 242/298 X |
| 5,419,504 | 5/1995 | Miyazaki et al. | 242/299 X |
| 5,485,903 | 1/1996 | Saito et al. | 242/247 X |
| 5,547,140 | 8/1996 | Kawabe et al. | 242/247 |
| 5,678,781 | 10/1997 | Hirano et al. | 242/247 |

FOREIGN PATENT DOCUMENTS 51-153293 of 1976 Japan .

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

The fishing reel comprises: a fishing line take-up drive mechanism (16) which is disposed in a reel main body (12) and drives a spool (10) so that the spool (10) takes up a fishing line therearound; a reversal preventive mechanism (18) which is disposed in the reel main body (12) and can be switched selectively between a reversal preventive state for preventing the reversal of the fishing line take-up drive mechanism in a fishing line play-out direction and a reversal allowable state for allowing the reversal of the fishing line take-up drive mechanism; and, a reversal prevention switching mechanism (22) which is disposed in the reel main body (12) and, by operating an operation part (20), switches the reversal preventive state and reversal allowable state of the reversal preventive mechanism over to each other. And, the reversal prevention switching mechanism holds the reversal preventive mechanism in the reversal preventive state while the operation part thereof is not operated, and can switch the reversal preventive mechanism from the reversal preventive state over to the reversal allowable state only when the operation part is operated.

6 Claims, 9 Drawing Sheets

FIG. 11(A)
FIG. 11(B)
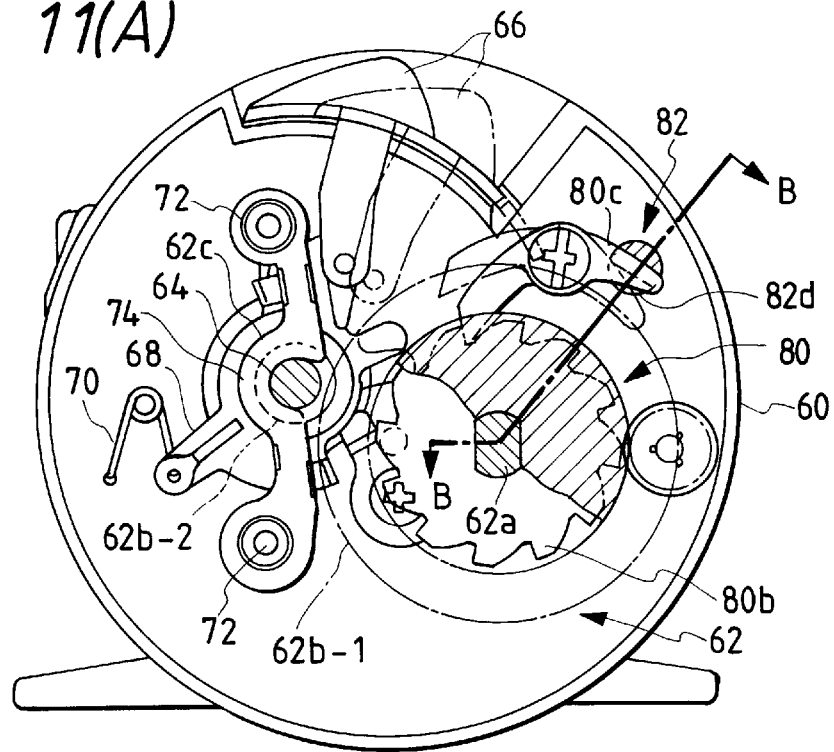
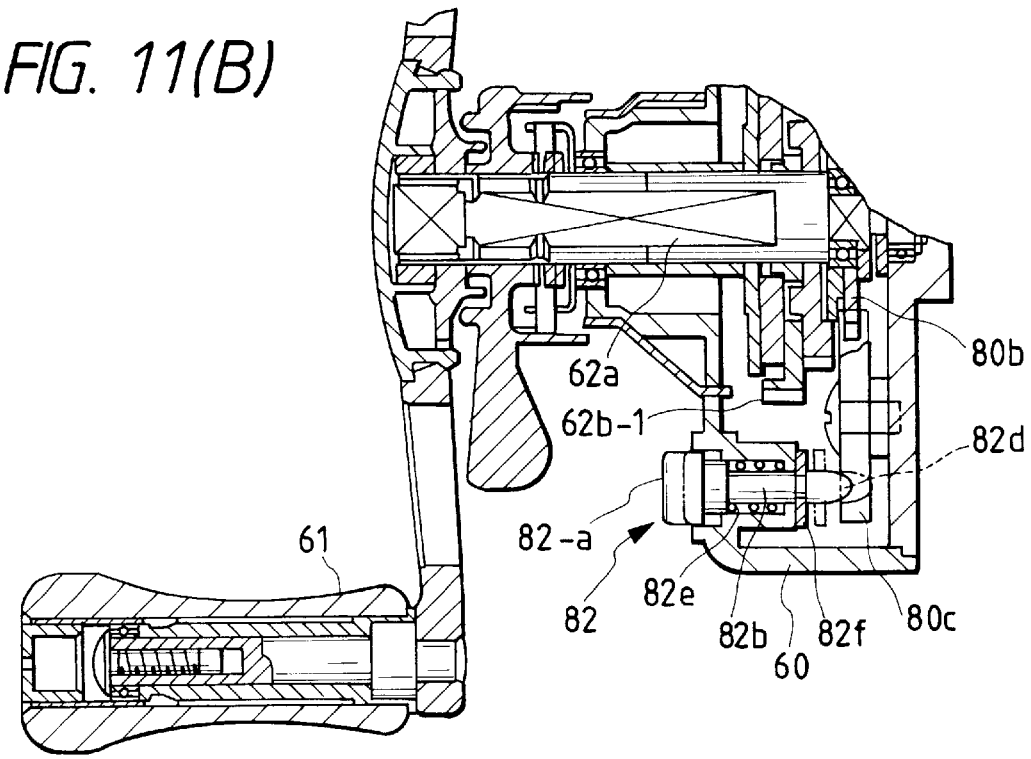

FISHING REEL HAVING A REVERSAL PREVENTATIVE MECHANISM

BACKGROUND OF THE INVENTION

The present invention relates to a fishing reel and, in particular, to a fishing reel which comprises: a fishing line take-up drive mechanism which is disposed in a reel main body and, when a drive force is input therein, allows a fishing line to be wound around a spool; a reversal preventive mechanism which is disposed in the reel main body and can be switched selectively between a reversal preventive state for preventing the reversal of the fishing line take-up drive mechanism in a fishing line play-out direction and a reversal allowable state for allowing the reversal of the fishing line take-up drive mechanism; and, a reversal prevention switching mechanism which is disposed in the reel main body, includes an operation part, and, by operating the operation part, switches the reversal preventive state and reversal allowable state of the reversal preventive mechanism over to each other.

As a conventional fishing reel of the above-mentioned type, for example, there is known a fishing reel which is disclosed in Japanese Utility Model Publication No. 51-153293 of Showa. In the conventional fishing reel of the above-mentioned type, normally, the reversal preventive mechanism is set in the reversal preventive state. And, the reversal prevention switching mechanism, by means of the manual operation of the operation part thereof, sets the reversal preventive mechanism selectively in either of the reversal preventive state or reversal allowable state.

In the conventional fishing reel of the above-mentioned type, (1) in order to prevent the fishing line from being wound onto the spool excessively and (2) in order to adjust the position of the terminal tackles of the fishing line with respect to the position of a shelf in a fishing spot, the reversal preventive mechanism can be switched from the reversal preventive state over to the reversal allowable state by means of operation of the operation part of the reversal prevention switching mechanism.

However, in the conventional fishing reel of the above-mentioned type, after the reversal preventive mechanism is switched from the reversal preventive state over to the reversal allowable state by means of operation of the operation part of the reversal prevention switching mechanism, the operator of the fishing reel sometimes can forget to return the reversal preventive mechanism from the reversal allowable state back to the reversal preventive state through the operation of the operation part of the reversal prevention switching mechanism.

Or, when the fishing line is entangled around the operation part of the reversal prevention switching mechanism or when something is butted against the operation part, the operation part can be sometimes switched from the reversal preventive state over to the reversal allowable state unexpectedly while the operator of the fishing reel does not notice it.

And, if the reversal prevention switching mechanism remains set in the reversal allowable state, then (1) when a fish catches a hook and the fishing line is thus pulled strongly by the fish, the spool or rotor can be rotated reversely at high speeds so that the fishing line can be played out excessively and can be thereby entangled, or the handle of the fishing line take-up drive mechanism can be turned reversely so that fingers of the operator of the fishing reel can be damaged, and (2) when the operator of the fishing reel moves to other places in the fishing spot, the hook, terminal tackles or fishing line can be entangled around rock, plants, or other person(s) so that the fishing line can be played out excessively and can be thereby entangled, or the fishing line can be played out naturally, which can enhance the possibility that the hook, terminal tackles or fishing line can be entangled around rock, plants or other person(s).

SUMMARY OF THE INVENTION

The present invention aims at eliminating the drawbacks found in the above-mentioned conventional fishing reel. Accordingly, it is an object of the invention to provide a fishing reel which is structured in the following manner: that is, the reversal allowable state of the reversal preventive mechanism is automatically switched over to the reversal preventive state, when, after the reversal preventive mechanism is switched from the reversal preventive state over to the reversal allowable state by means of operation of the operation part of the reversal prevention switching mechanism, it is forgotten that the reversal preventive mechanism is returned from the reversal allowable state back to the reversal preventive state through the operation of the operation part of the reversal prevention switching mechanism; and, even when, because the fishing line is entangled around the operation part of the reversal prevention switching mechanism or because something is butted against the operation part, the operation part is switched from the reversal preventive state over to the reversal allowable state unexpectedly while the operator of the fishing reel does not notice it, the thus switched reversal allowable state of the reversal preventive mechanism is automatically switched over to the reversal preventive state, whereby, even when a fish catches a hook and the fishing line is thus pulled strongly by the fish, there is eliminated the possibilities that the spool or rotor can be rotated reversely at high speeds, the fishing line can be played out excessively to be thereby entangled, the handle of the fishing line take-up drive mechanism can be turned reversely to thereby damage the fingers of the operator of the fishing reel, or even when the operator of the fishing reel moves to other places in the fishing spot, there is eliminated the possibility that the hook, terminal tackles or fishing line can be entangled around rock, plants, or other person(s) so that the fishing line can be played out excessively and can be thereby entangled, or when the fishing line is played out naturally, there is eliminated a fear of enhancing the possibility that the hook, terminal tackles or fishing line can be entangled around rock, plants or other person(s).

In attaining the above object, according to the invention there is provided a fishing reel which comprises: at reel main body; a fishing line take-up drive mechanism which is disposed in the reel main body and, when a drive force is input therein, allows a fishing line to be wound around a spool; a reversal preventive mechanism which is disposed in the reel main body and can be switched selectively between a reversal preventive state for preventing the reversal of the fishing line take-up drive mechanism in a fishing line play-out direction and a reversal allowable state for allowing the reversal of the fishing line take-up drive mechanism; and, a reversal prevention switching mechanism which is disposed in the reel main body, includes an operation part, and, by operating the operation part, switches the reversal preventive state and reversal allowable state of the reversal preventive mechanism over to each other. And, the present fishing reel is further characterized in that the reversal prevention switching mechanism holds the reversal preventive mechanism in the reversal preventive state while the operation part of the reversal prevention switching mechanism is not operated and switches the reversal preventive mechanism from the reversal preventive state over to the reversal allowable state only when the operation part is operated.

In the fishing reel according to the present invention characterized by the above-mentioned structure, as described above, the reversal prevention switching mechanism is performing its automatic reversal preventing operation function that it holds the reversal preventive mechanism in the reversal preventive state while the operation part of the reversal prevention switching mechanism is not operated and switches the reversal preventive mechanism over to the reversal allowable state only when the operation part is operated. Preferably, the present invention includes manual select means which, during the above-mentioned automatic reversal preventing operation function of the reversal prevention switching mechanism, independently of the operation of the operation part of the reversal prevention switching mechanism, performs a manual select switching operation function capable of switching the reversal prevention switching mechanism selectively between the reversal preventive state and the reversal allowable state.

Use of this structure can widen the selection range of the application method of the fishing reel according to the invention, which can meet the demands of the operator of the fishing reel according to the invention more widely.

The fishing reel according to the present invention characterized by the above-mentioned structure can be structured in the following manner: that is, the reversal preventive mechanism includes a ratchet wheel rotatable together with the fishing line take-up drive mechanism, a securing click freely movable between an engaging position for engagement with the ratchet wheel and an engagement removal position for removing the engagement with the ratchet wheel, and energizing means for energizing the securing click toward the engaging position; the operation part of the reversal prevention switching mechanism can be moved freely between a securing click operation position, in which the securing click can be operated to move from the engaging position to the engagement removal position against the energizing force of the energizing means, and an engaging click operation removal position in which the securing click can be returned from the engagement removal position to the engaging position due to the energizing force of the energizing means; and, the reversal prevention switching mechanism includes energizing means which energizes the operation part of the reversal prevention switching mechanism toward the securing click operation position.

Also, the fishing reel according to the present invention can also be structured in the following manner: the operation part of the reversal prevention switching mechanism is disposed in the reel main body in such a manner that it is free to rotate on its own axis., and includes an eccentric pressure projection; and, the eccentric pressure projection, when the operation part is rotated between the securing click operation position and the securing click operation removal position, at the securing click operation position of the operation part, presses against the securing click held at the engaging position to thereby move the same from the engaging position to the engagement removal position against the energizing force of the energizing means, and, at the engaging click operation removal position, removes its pressure against the securing click to thereby allow the securing click to be moved from the engaging removal position to the engaging position due to the energizing force of the energizing means.

Further, the energizing means, which is disposed in the reel main body in such a manner that it is free to rotate on its own axis, can consist of a torsion coil spring which includes one end fixed to the reel main body and the other end fixed to the operation part; such torsion coil spring can be wound around the operation part; and, such torsion coil spring can consist of a plate spring which is interposed between the reel main body and the eccentric pressure projection and, at the securing click operation position of the operation part, can be pressed by the eccentric pressure projection to thereby store an elastic force therein.

And, the operation part of the reversal prevention switching mechanism is disposed in the reel main body in such a manner that it is free to reciprocate linearly along the outer surface of the reel main body between the securing click operation position and the securing click operation removal position, and includes an eccentric pressure projection; and, the eccentric pressure projection, when the operation part is reciprocated linearly between the securing click operation position and the securing click operation removal position, at the securing click operation position of the operation part, presses against the securing click held at the engaging position to thereby move the same from the engaging position to the engagement removal position against: the energizing force of the energizing means, and, at the engaging click operation removal position, removes its pressure against the securing click to thereby allow the securing click to be moved from the engaging removal position to the engaging position due to the energizing force of the energizing means.

Also, the energizing means, which is used for the operation part disposed in the reel main body in such a manner that it is free to reciprocate linearly, can be formed of a torsion coil spring, a plate spring, a compression coil spring or any other elastic member which includes one end fixed to the reel main body and the other end fixed to the operation part.

Further, the operation part of the reversal prevention switching mechanism is disposed in the reel main body in such a manner that it is free to appear and disappear reciprocatingly with respect to the outer surface of the reel main body between the securing click operation position and the securing click operation removal position, and includes an inclined surface; and, the inclined surface, when the operation part is made to appear and disappear reciprocatingly with respect to the outer surface of the reel main body between the securing click operation position and the securing click operation removal position, at the securing click operation position of the operation part, presses against the securing click held at the engaging position to thereby move the same from the engaging position to the engagement removal position against the energizing force of the energizing means, and, at the engaging click operation removal position, removes its pressure against the securing click to thereby allow the securing click to be moved from the engaging removal position to the engaging position due to the energizing force of the energizing means.

And, the energizing means, which is used for the operation part disposed in the reel main body in such a manner that it is free to appear and disappear reciprocatingly with respect to the outer surface of the reel main body, can be formed of a torsion coil spring, a plate spring, a compression coil spring or any other elastic member which includes one end fixed to the reel main body and the other end fixed to the operation part.

The fishing reel according to the invention characterized by the above-mentioned structure can be further structured in the following manner: that is, the reversal preventive mechanism includes a cam groove which is formed in the reel main body and includes an inner peripheral surface opposed to the outer peripheral surface of an element rotatable by a drive force input to the fishing line take-up drive mechanism; a plurality of cam recessed portions which are respectively formed in the inner peripheral surface of the cam groove and vary gradually in depth in the peripheral direction of the inner peripheral surface; a plurality of clan members which are respectively disposed in the plurality of cam recessed portions of the inner peripheral surface of the cam groove, are free to rotate in the respective deepest portions of the plurality of cam recessed portions, and, if they are moved from the deepest portions toward the respective shallowest portions of the plurality of cam recessed portions, can be held by and between the respective bottom portions of the plurality of cam recessed portions and the outer peripheral surface of the above-mentioned element; and, a cam member hold annular member which is interposed between the inner peripheral surface of the cam groove and the outer peripheral surface of the above-mentioned element and includes a plurality of cam member hold holes respectively for holding therein the plurality of cam members in such a manner that the cam members can be freely rotated.

And, in this case, the operation part of the reversal prevention switching mechanism moves the cam member hold annular member selectively between a reversal preventive position and a reversal allowable position; in particular, the reversal preventive position is a position at which, by moving the plurality of cam members from the respective deepest portions of the plurality of cam recessed portions toward the respective shallowest portions thereof, the plurality of cam members are respectively held by and between the bottom portions of the plurality of cam recessed portions is and the outer peripheral surface of the above-mentioned element, thereby being able to prevent the above-mentioned element, which can be rotated by the drive force input to the fishing line take-up drive mechanism, from being rotated with respect to the reel main body; and, the reversal allowable position at which the plurality of cam members are moved from the shallowest portions of the plurality of the cam recessed portions to the deepest portions thereof to remove the holding of the plurality of cam members by and between the bottom portions of the plurality of cam recessed portions and the outer peripheral surface of the above-mentioned element, thereby allowing the reversed rotation of the above-mentioned element rotatable by the drive force input to the fishing line take-up drive mechanism.

BRIEF DESCRIPTION OF THE DRAWINGS

In the accompanying drawings:

FIG. 11(A) is a longitudinal sectional view of one side wall of a double bearing type fishing reel which is one of fishing reels according to a fourth embodiment of the invention; and, FIG. 11(B) is a schematic horizontal sectional view taken along the line B—B shown in FIG. 11(A);

DETAILED DESCRIPTION OF THE PREFERRED EMBODIMENTS

Now, description will be given below in detail of various embodiments and various modifications of a fishing reel according to the invention with reference to the accompanying drawings.

First Embodiment

At first, description will be given below of a spinning reel for fishing, which is one of fishing reels according to a first embodiment of the invention, with reference to FIGS. 1 to 5.

Figure 1:
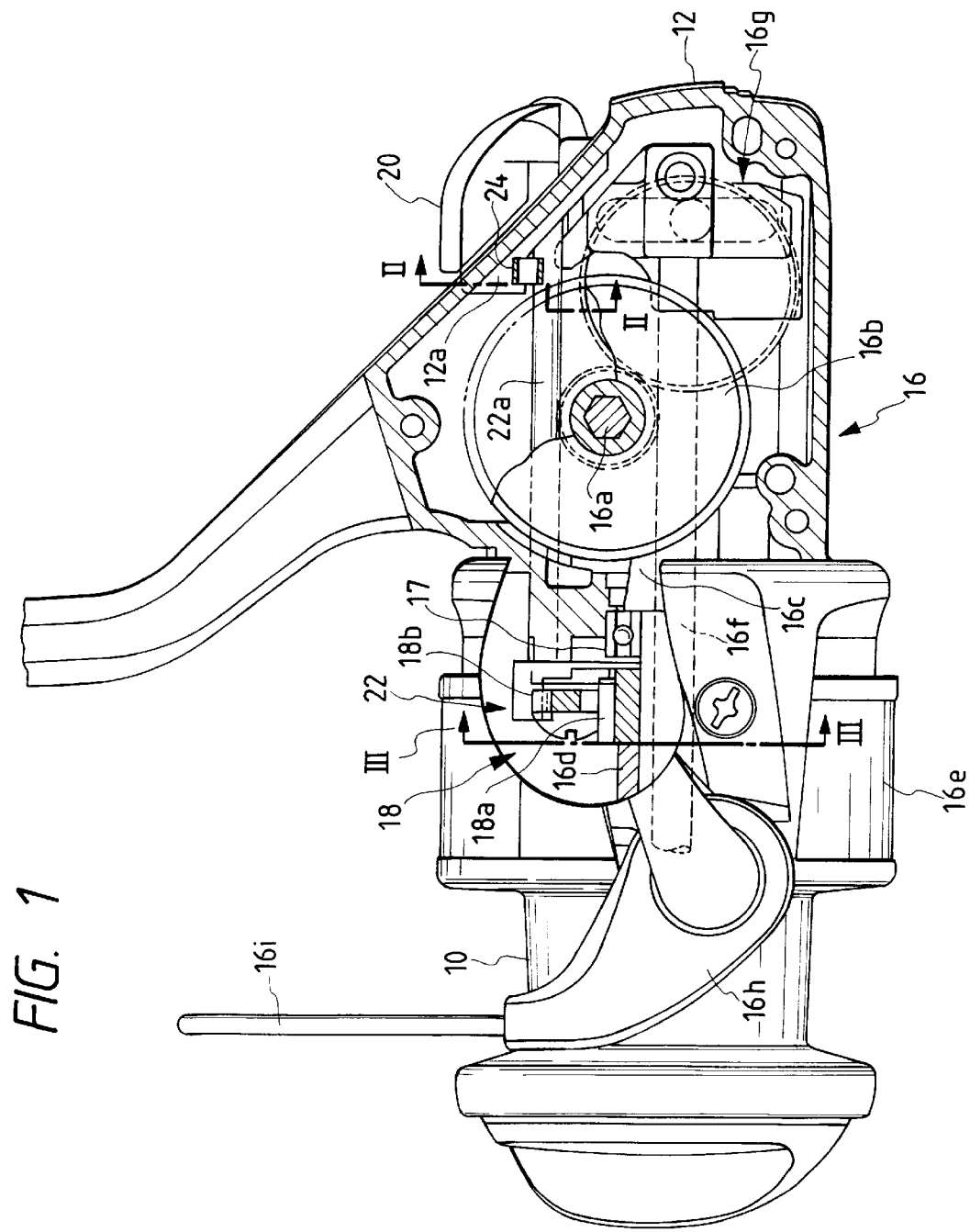
FIG. 1 is a partially broken side view of a spinning reel for fishing which is one of fishing reels according to a first embodiment of the invention.

In FIG. 1, there is shown a partially broken side view of a spinning reel for fishing which is one of fishing reels according to the first embodiment of the invention.

The present spinning reel for fishing includes a spool 10 and a reel main body 12 which supports in the front face thereof the spool 10 in such a manner that the spool 10 can be freely reciprocated back and forth within a given range. The reel main body 12 includes a fishing line take-up drive mechanism 16 which, when a drive force is input therein, drives the spool 10 so that the spool 10 can take up a fishing line (not shown) thereon.

The fishing line take-up drive mechanism 16 includes a handle shaft 16a which is rotatably supported by the reel main body 12 and to which there can be input a drive force from a rotary handle (not shown) projecting out from the side surface of the reel main body 12, a drive gear 16b which is concentrically fixed to the handle shaft 16a in the interior portion of the reel main body 12, a hollow pinion gear 16c which is supported in the interior portion of the reel main body 12 in such a manner that it is free to rotate with respect to the reel main body 12 through a bearing 17 but, in the longitudinal direction thereof, it is unable to rotate with respect to the reel main body 12, and a rotor 16e which is concentrically fixed through a rotor support portion 16d to the projecting end portion of the pinion gear 16c that projects out from the front end portion of the reel main body 12.

The fishing line take-up drive mechanism 16 further includes a spool shaft 16f which is supported in the central hole of the pinion gear 16c in such a manner that it is free to rotate with respect to the pinion gear 16c and is free to rotate in the longitudinal direction thereof as well, and a spool reciprocating mechanism 16g which, if a rotation force is input therein from the drive gear 16b, then reciprocates the spool shaft 16 in the longitudinal direction with respect to the reel main body 12 within a given range, while the spool 10 is supported through drag means (not shown) on the projecting end portion of the spool shaft 16f that projects out from the front end portion of the reel main body 12.

The fishing line take-up drive mechanism 16 further includes a bail 16i which is mounted on the outer peripheral surface of the rotor 16e in such a manner that it can be freely swung in the longitudinal direction within a given range through a pair of bail support arms 16h.

And, the above-mentioned structure of the fishing line take-up drive mechanism 16 is known.

As shown in FIG. 1, if the rotation handle (not shown) projecting from the side surface of the reel main body 12 is rotated in a given direction while the bail 16i is situated at a raised-up position opposed to the outer peripheral surface of the spool 10, then the spool reciprocating mechanism 16g reciprocates the spool 10 together with the spool shaft 16a in the longitudinal direction within a given range with respect to the reel main body 12, while the pinion gear 16c of the rotor 16e rotates the rotor 16e together with the pair of bail support arms 16h and bail 16i.

During this operation, a fishing line (not shown), which passes through the outside of the bail 16i from the outer peripheral surface of the spool 10 and projects toward the leading end of a fishing rod (not shown), is guided by the outer peripheral surface of the bail 16i and placed onto a line roller (not shown) of one of the bail support arms 16h on the rotation rear end side and, after then, is wound by the line roller (not shown) onto the outer peripheral surface of the spool 10 which is reciprocating in the longitudinal direction within a given range.

By the way, if the bail 16i is pushed down forwardly from the raised-up position (fishing line take-up position) and is thereby situated at a pushed-down position (fishing line play-out position) at which the bail 16 is fallen down forwardly from the raised-position and is thus not opposed to the outer peripheral surface of the spool 10, then the fishing line (not shown), when it is pulled forwardly, is shifted from the line roller (not shown) on one of the bail support arms 16h so that it can be freely played out forwardly in a spiral manner from the outer peripheral surface of the spool 10.

The reel main body 12 further incorporates in the interior portion thereof a reversal preventive mechanism 18, which can be switched selectively between a reversal preventive state to prevent the reversal of the fishing line take-up drive mechanism 16 in the fishing line play-out direction and a reversal allowable state to allow the reversal of the fishing line take-up drive mechanism 16, and a reversal prevention switching mechanism 22 which, by operating an operation lever (operation part) 20 which is so) provided as to project from the rear end face of the reel main body 12, can switch the reversal preventive state and reversal allowable state of the reversal preventive mechanism 18 over to each other.

Figure 2:
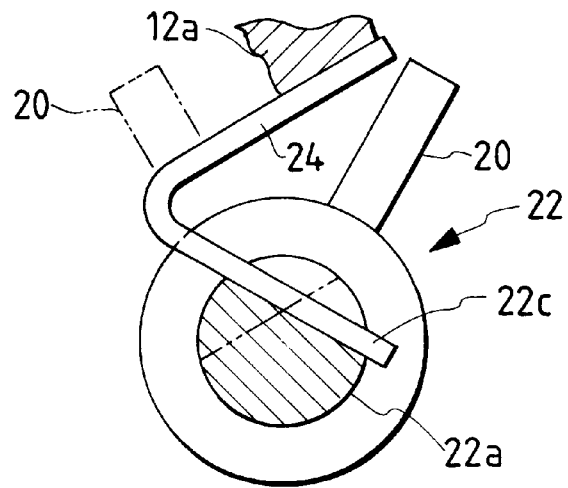
FIG. 2 is a transverse sectional view of an operation lever (operation part) of a reversal prevention switching mechanism shown in FIG. 1, taken along the line II—II shown in FIG. 1.
Figure 3:
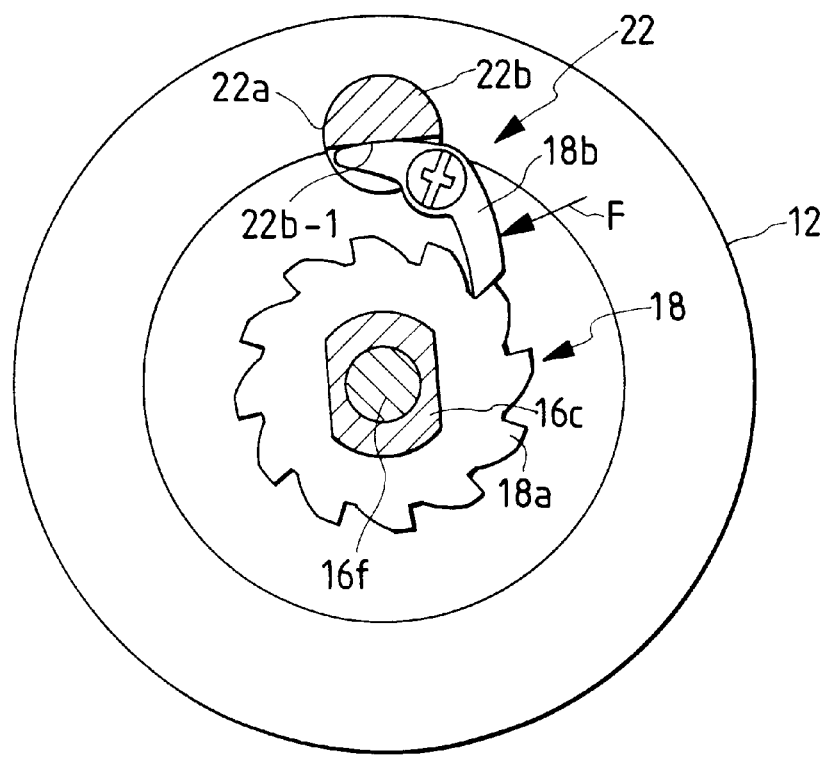
FIG. 3 is a transverse sectional view of part of the reversal prevention switching mechanism and a reversal preventive mechanism shown in FIG. 1, taken along the line III—III shown in FIG. 1.

Now, FIG. 2 is a transverse section view of the operation lever (operation part) 20 of the reversal prevention switching mechanism 22 shown in FIG. 1, taken along the line II—II shown in FIG. 1, and FIG. 3 is a transverse section view of part of the reversal prevention switching mechanism 22 and the reversal preventive mechanism 18 shown in FIG. 1, taken along the line III—III shown in FIG. 1.

The reversal preventive mechanism 18, as shown in FIGS. 1 and 3, includes a ratchet wheel 18a which, in the front end face of the reel main body 12, is concentrically fixed to the pinion gear 16c rotatably supported to the reel main body 12 through the bearing 17. The reversal preventive mechanism 18 further includes a securing click 18b which, in the front end face of the reel main body 12, is rotatably supported in the neighborhood of the outer peripheral edge of the ratchet wheel 18a. The securing click 18b, as shown in FIG. 3, can be freely rotated between an engaging position, at which one end portion thereof is engaged with the ratchet wheel 18a, and an engagement removal position at which the one end portion thereof is detached from the ratchet wheel 18a to thereby remove its engagement with the ratchet wheel 18a; and, the securing click 18b, as shown in FIG. 3, is energized into the engaging position at which the one end portion thereof is engaged with the ratchet wheel 18a with an energizing force designated by an arrow F in FIG. 3 that is applied by known energizing means (not shown) such as a torsion coil spring or the like.

The reversal prevention switching mechanism 22, as shown in FIGS. 1 and 3, includes an operation rod 22a which extends from the operation lever (operation part) 20, which projects from the rear end face of the reel main body 12, up to the neighborhood of the securing click 18b. The operation rod 22a is rotatably supported in the reel main body 12 and includes, in the front end face thereof projecting from the front end face of the reel main body 12, as shown in FIG. 3, an eccentric projection 22b which is eccentric to the center of rotation of the operation rod 22a. In the present embodiment, the eccentric projection 22b has a substantially semicircular cross section, with the linear portion 22b-1 thereof being in contact with the other end portion of the securing click 18b held at the engaging position.

The rotational position of the operation lever (operation part) 20 in the above operation is shown by a solid line in FIG. 2, this rotational position is the securing click operation removal position of the operation lever (operation part) 20.

The operation rod 22a is energized to the securing click operation removal position by energizing means and, in the present embodiment, energizing means for energizing the operation rod 22a, as shown in FIGS. 1 and 2, is composed of a substantially V-shaped plate spring 24 which is interposed between an engaging projection 12a formed on the inner surface of the rear end wall of the reel main body 12 in the inner space of the reel main body 12 and a substantially semicircular-shaped engaging recess 22c formed in the outer peripheral surface of the operation rod 22a in the neighborhood of the above rear end wall of the reel main body 12.

Figure 4:
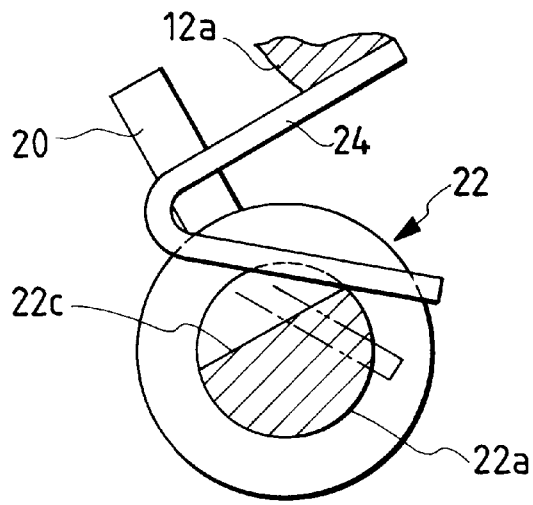
FIG. 4 is, similarly to FIG. 2, a transverse sectional view of the operation lever (operation part) of the reversal prevention switching mechanism shown in FIG. 1, showing a state when the operation lever (operation part) is operated.
Figure 5:
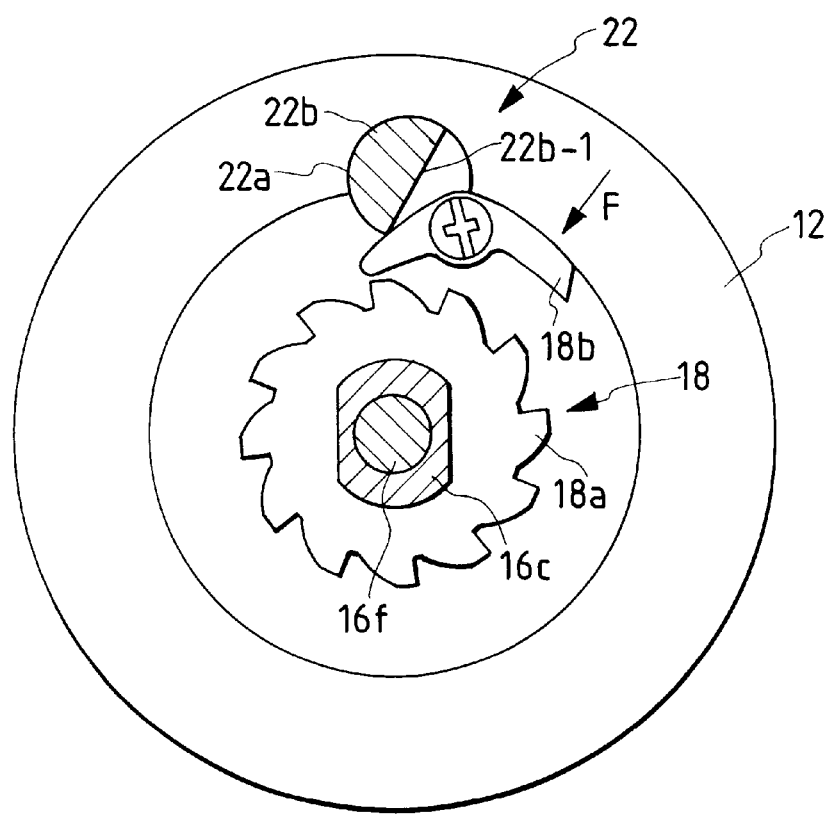
FIG. 5 is, similarly to FIG. 3, a transverse sectional view of part of the reversal prevention switching mechanism and the reversal preventive mechanism shown in FIG. 1, showing a state when the operation lever (operation part) of the reversal prevention switching mechanism shown in FIG. 1 is operated.

Now, in FIG. 4, there is shown the same transverse section of the operation lever (operation part) 20 of the reversal prevention switching mechanism 22 of FIG. 1 as FIG. 2, showing a state in which the operation lever (operation part) 20 is operated. And, FIG. 5 is the same transverse section view as FIG. 3, showing the states of part of the reversal prevention switching mechanism 22 as well as the reversal preventive mechanism 18 shown in FIG. 1 when the operation lever (operation part) 20 of the reversal prevention switching mechanism 22 of FIG. 1 is operated.

If the operation lever (operation part) 20 is pressed down to thereby rotate the operation lever (operation part) 20 by a given angle counterclockwise, when viewed from the front end face of the reel main body 12, from the securing click operation removal position shown by the solid line in FIG. 2 to the position shown by a two-dot chained line in FIG. 2, then the engaging recessed portion 22c of the operation rod 22a is pressed against the corresponding one end portion of the plate spring 24 so that the plate spring 24 is caused to increase its energizing force against the engaging recessed portion 22c of the operation rod 22a.

In this operation, the eccentric projection 22b on the front end face of the operation rod 22a presses against the other end portion of the securing click 18b by means of the linear-shaped portion 22-1. As a result of this, the securing click 18b is rotated counterclockwise from the engaging position shown in FIG. 3 against the energizing force F of the known energizing means (not shown) and, as shown in FIG. 5, the one end portion of the securing click 18b is thereby detached from the ratchet wheel 18a, so that the securing click 18b is situated at the engagement removal position for removing its engagement with the ratchet wheel 18a.

As a result of this, the ratchet wheel 18a and securing click 18b of the reversal preventive mechanism 18 are held in the reversal allowable state that not only allows the reversal of the pinion gear 16c of the fishing line take-up drive mechanism 16 but also allows the rotor 16e, which is mounted through the rotor support portion 16d onto the pinion gear 16c, to be freely reversed in the fishing line play-out direction.

By the way, the rotational position of the operation lever (operation part) 20 in the above operation is shown by a solid line in FIG. 4, this rotational position is the securing click operation position of the operation lever (operation part) 20.

And, the rotational movements of the operation lever (operation part) 20 respectively exceeding the area ranging from the securing click operation removal position shown by the solid line shown in FIG. 2 to the securing click operation position shown by the solid line shown in FIG. 4 are prevented by a rotation restrict projection (not shown) or a stepped portion (not shown) formed on the outer surface of the rear end wall of the reel main body 12.

If the above-mentioned pressure against the operation lever (operation part) 20 is released, then the operation lever (operation part) 20 is automatically rotated by a given angle clockwise, when viewed from the front end face of the reel main body 12, due to the energizing force given from the plate spring 24 pressed against the engaging recess 22c of the operation rod 22a from the securing click operation position shown by the solid line shown in FIG. 4, and is thus returned to the securing click operation removal position shown by the solid line shown in FIG. 2.

In this operation, the eccentric projection 22b on the front end face of the operation rod 22a is rotated and returned by a given angle from the engagement operation position at which, as shown in FIG. 5, the other end portion of the securing click 18b is pressed by the linear-shaped portion 22-1, to the engagement operation removal position at which, as shown in FIG. 3, the pressing of the other end portion of the securing click 18b by the linear-shaped portion 22-1 is removed. As a result of this, the securing click 18b is allowed to automatically rotate and return due to the energizing force F of the known energizing means (not shown) from the engagement removal position shown in FIG. 5 to the engaging position shown in FIG. 3, so that the one end portion of the securing click 18b is engaged again with the ratchet wheel 18a.

Due to this, the ratchet wheel 18a and securing click 18b of the reversal preventive mechanism 18 are held in the reversal preventive state that not only prevents the reversal of the pinion gear 16c of the fishing line take-up drive mechanism 16 but also prevents the rotor 16e, which is mounted through the rotor support portion 16d onto the pinion gear 16c, from being freely reversed in the fishing line play-out direction.

As can be seen clearly from the above-mentioned detailed description with reference to FIGS. 1 to 5, the reversal prevention switching mechanism 22 holds the reversal preventive mechanism 18 in the reversal preventive state while the operation lever (operation part) 20 is not operated, and switches the reversal preventive mechanism 18 from the reversal preventive state to the reversal allowable state only when the operation lever (operation part) 20 is operated.

Modification of the First Embodiment

Next, with reference to FIGS. 6 and 7, description will be given below of a modification of a spinning reel for fishing which is one of fishing reels according to the first embodiment of the invention described heretofore with reference to FIGS. 1 to 5. In particular, FIG. 6 is an enlarged longitudinal section view of the main portions of a modification of a spinning reel for fishing which is one of fishing reels according to the first embodiment of the invention described heretofore with reference to FIGS. 1 to 5, and FIG. 7 is a transverse section view schematically taken along the line VII—VII shown in FIG. 6.

The modification of a spinning reel for fishing which is one of fishing reels according to the first embodiment of the invention which has been described heretofore with reference to FIGS. 1 to 5 is different from the spinning reel for fishing according to the first embodiment of the invention in that, as the energizing means for holding the reversal preventive switching mechanism 22 at the securing click operation removal position while the operation lever (operation part) is not operated, instead of the plate spring 24 used in the first embodiment, there is used a torsion coil spring 30.

Figure 6:
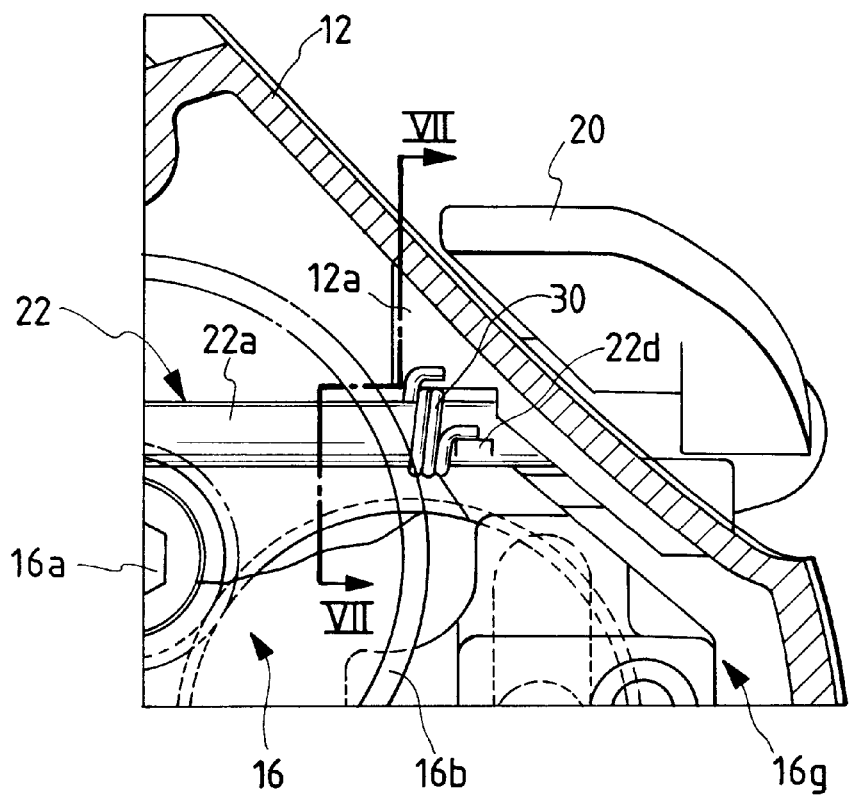
FIG. 6 is an enlarged longitudinal sectional view of the main portions of a first modification of a spinning reel for fishing which is one of fishing reels according to the first embodiment of the invention that has been described with reference to FIGS. 1 to 5.
Figure 7:
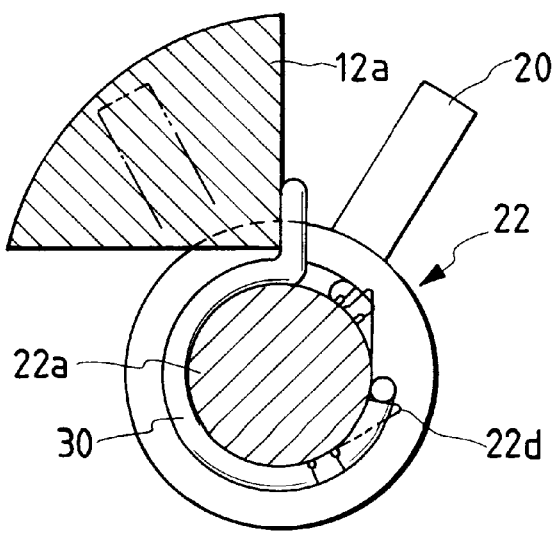
FIG. 7 is a schematic transverse sectional view taken along the line VII—VII shown in FIG. 6.

This torsion coil spring 30, as shown in FIGS. 6 and 7, in the outer peripheral surface of the operation rod 22a of the reversal prevention switching mechanism 22, is wound around the neighborhood of the inner surface of the rear end wall of the reel main body 12, while one end portion of the torsion coil spring 30 is secured to the engaging projection 12a provided on the present inner surface with the other end portion thereof secured to an engaging projection 22d provided on the present outer peripheral surface. And, because the plate spring 24 used in the first embodiment shown in FIGS. 1 to 5 is not used in this modification, there is omitted the engaging recess 22c which is formed in the present outer peripheral surface of the operation rod 22a for engagement of the plate spring 24.

The operation of the thus structured modification is identical with the operation of the spinning reel for fishing according to the first embodiment of the invention which has been previously described with reference to FIGS. 1 to 5.

Second Embodiment

Figure 8:
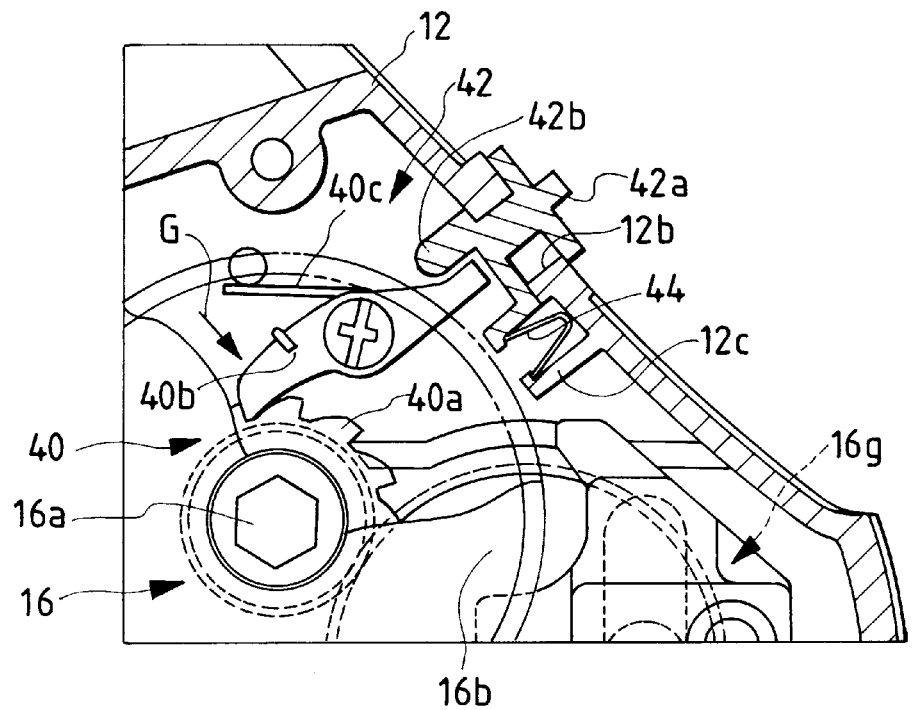
FIG. 8 is an enlarged longitudinal sectional view of the main portions of a spinning reel for fishing which is one of fishing reels according to a second embodiment of the invention, showing a state when a reversal preventive mechanism thereof is set in a reversal preventive state.
Figure 9:
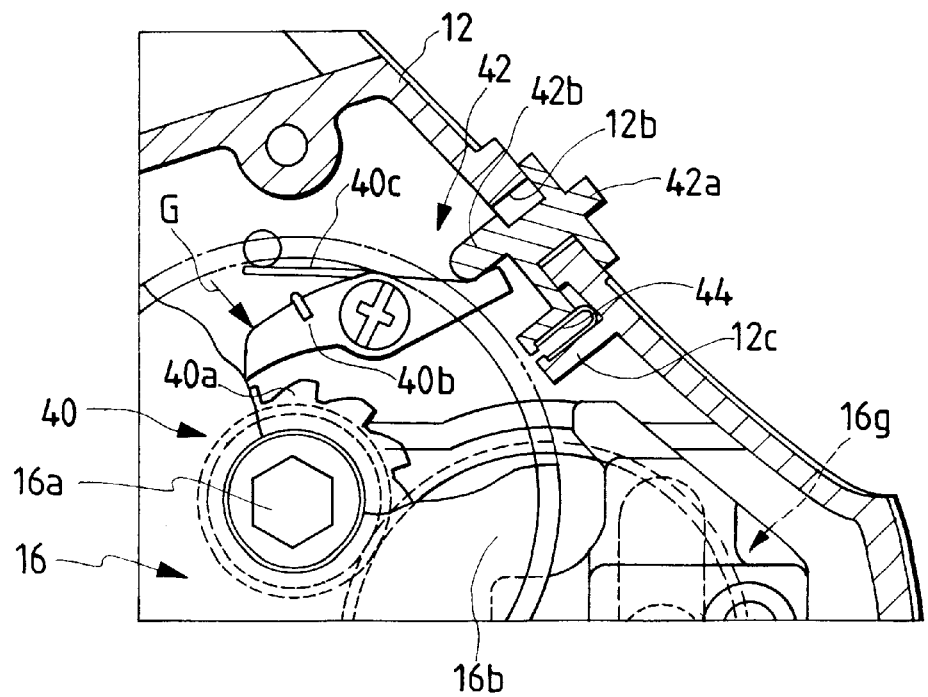
FIG. 9 is an enlarged longitudinal section view of the main portions of the spinning reel for fishing shown in FIG. 8, showing a state when the reversal preventive mechanism thereof is set in a reversal allowable state.

Next, description will be given below of a spinning reel for fishing, which is one of fishing reels according to a second embodiment of the invention, with reference to FIGS. 8 and 9. In particular, FIG. 8 is an enlarged longitudinal section view of the main portions of a spinning reel for fishing which is one of fishing reels according to a second embodiment of the invention, showing a state in which a reversal preventive mechanism is set in a reversal preventive state, and FIG. 9 is an enlarged longitudinal section view of the main portions of a spinning reel for fishing shown in FIG. 8, showing a state in which the reversal preventive mechanism is set in a reversal allowable state.

The spinning reel for fishing, which is one of fishing reels according to the second embodiment of the invention, is different in the structures of the reversal preventive mechanism and reversal prevention switching mechanism from the spinning reel for fishing according to the first embodiment of the invention which has been previously described with reference to FIGS. 1 to 5.

In other words, in the spinning reel for fishing which is one of fishing reels according to the previously described first embodiment of the invention, the reversal preventive mechanism 18 is disposed on the front end face of the reel main body 12, whereas, in the spinning reel for fishing which is one of fishing reels according to the second embodiment of the invention, a reversal preventive mechanism 40 is disposed on the periphery of a handle shaft 16 of a fishing line take-up mechanism 16.

Also, in the spinning reel for fishing which is one of fishing reels according to the previously described first embodiment of the invention, the reversal prevention switching mechanism 22 is so disposed as to extend out from the front end face of the reel main body 12 up to the rear end face thereof and, on the other hand, in the spinning reel for fishing which is one of fishing reels according to the second embodiment of the invention, a reversal prevention switching mechanism 42 is disposed only on the rear end face of the reel main body 12.

Describing in more detail, the reversal preventive mechanism 40 of the second embodiment includes not only a ratchet wheel 40a which, in the inner space of the reel main body 12, is concentrically fixed to a handle shaft 16a in the neighborhood of the inner surface of one side wall, but also a securing click 40b which, in the present inner surface of the reel main body 12, is rotatably supported in the neighborhood of the outer peripheral edge of the ratchet wheel 40a.

The securing click 40b, as shown in FIG. 8, can be freely rotated between an engaging position, at which one end portion of the securing click 40b is engaged with the ratchet wheel 40a, and an engagement removal position at which the present one end portion thereof is detached from the ratchet wheel 40a to thereby remove its engagement with the ratchet wheel 40a. And, the securing click 40b is energized to the engaging position, at which one end portion of the securing click 40b is engaged with the ratchet wheel 40a, due to an energizing force which is shown by an arrow G in FIG. 8 and is applied by known energizing means 40c such as a torsion coil spring or the like.

The reversal prevention switching mechanism 42 includes an operation lever (operation part) 42a which is supported in a linear reciprocation guide hole 12b formed in the rear end wall of the reel main body 12 and extended by a given distance in the vertical direction in such a manner that the operation lever (operation part) 42a can be freely reciprocated linearly in the vertical direction along the present rear end wall of the reel main body 12. And, the operation lever (operation part) 42a includes a pressure projection 42b which projects into the inner space of the reel main body 12 and comes into contact, from above, with the other end portion of the securing click 40b of the reversal preventive mechanism 40 situated at the engaging position.

The position of the operation lever (operation part) 42a at the then time is shown by a solid line in FIG. 8 and this position provides the securing click operation removal position of the operation lever (operation part) 42a.

The operation lever (operation part) 42a is energized to the above-mentioned securing click operation removal position by energizing means and, in the present embodiment, the energizing means for energizing the operation lever (operation part) 42a, as shown in FIG. 8, is composed of a substantially V-shaped plate spring 44 which is interposed between the lower end face of the operation lever (operation part) 42a and an engaging projection 12c which, in the inner space of the reel main body 12, is provided below the operation lever (operation part) 42a.

If the operation lever (operation part) 42a is pressed down to thereby lower the operation lever (operation part) 42a along the rear end wall of the reel main body 12 from the securing click operation removal position thereof shown by a solid line in FIG. 8, then the lower end face of the operation lever (operation part) 42a is pressed against the corresponding one end portion of the plate spring 44, thereby increasing the energizing force that is applied to the lower end face of the operation lever (operation part) 42a by the plate spring 44.

In this operation, the pressure projection 42b of the operation lever (operation part) 42a is pressed against the other end portion of the securing click 40b. In consequence, the securing click 40b is rotated clockwise from the engaging position shown in FIG. 8 against the energizing force G of the energizing means 40c and, as shown in FIG. 9, the one end portion thereof is detached from the ratchet wheel 40a, so that the securing click 40b is situated at the engagement removal position for removing its engagement with the ratchet wheel 40a.

As a result of this, the ratchet wheel 40a and securing click 40b of the reversal preventive mechanism 40 are respectively held in the reversal allowable state which not only allows the reversal of the handle shaft 16a of the fishing line take-up drive mechanism 16 but also allows the free reversal of the rotor 16e (see FIG. 1) in the fishing line play-out direction through the drive gears 16b and pinion gear 16c.

The position of the operation lever (operation part) 42a at the then time is shown by a solid line in FIG. 9 and this position provides the securing click operation position of the operation lever (operation part) 42a.

And, the rotational movements of the operation lever (operation part) 42a respectively exceeding the area ranging from the securing click operation removal position shown by the solid line shown in FIG. 8 to the securing click operation position shown by the solid line shown in FIG. 9 are prevented by the upper and lower end faces of linear reciprocation guide hole 12b formed in the rear end wall of the reel main body 12.

If the above-mentioned pressure against the operation lever (operation part) 42a is released, then the operation lever (operation part) 42a is automatically rotated upwardly by a given distance due to the energizing force from the plate spring 44 that is applied to the lower surface of the operation lever (operation part) 42a from the securing click operation position shown by the solid line shown in FIG. 9, and is thus returned to the securing click operation removal position shown by the solid line shown in FIG. 8.

In this operation, the pressure projection 42b provided on the operation lever (operation part) 42a is linearly moved and returned in the upward direction by a given distance from the engagement operation position at which, as shown in FIG. 9, it is pressed against the other end portion of the securing click 40b, to the engagement operation removal position at which, as shown in FIG. 8, the pressing of the other end portion of the securing click 40b is removed. In consequence, the securing click 40b is allowed to automatically rotate and return due to the energizing force G of the energizing means 40c from the engagement removal position shown in FIG. 9 to the engaging position shown in FIG. 8, so that the one end portion of the securing click 40b is engaged again with the ratchet wheel 40a.

As a result of this, the ratchet wheel 40a and securing click 40b of the reversal preventive mechanism 40 are respectively held in the reversal preventive state that not only prevents the reversal of the pinion gear 16c of the fishing line take-up drive mechanism 16 but also prevents the rotor 16e (see FIG. 1) from being freely reversed in the fishing line play-out direction through the drive gear 16b and pinion gear 16c.

As can be seen clearly from the above-mentioned detailed description with reference to FIGS. 8 and 9, the reversal prevention switching mechanism 42 holds the reversal preventive mechanism 40 in the reversal preventive state while the operation lever (operation part) 42a is not operated, and can switch the reversal preventive mechanism 40 from the reversal preventive state to the reversal allowable state only when the operation lever (operation part) 42a is operated.

Third Embodiment

Figure 10:
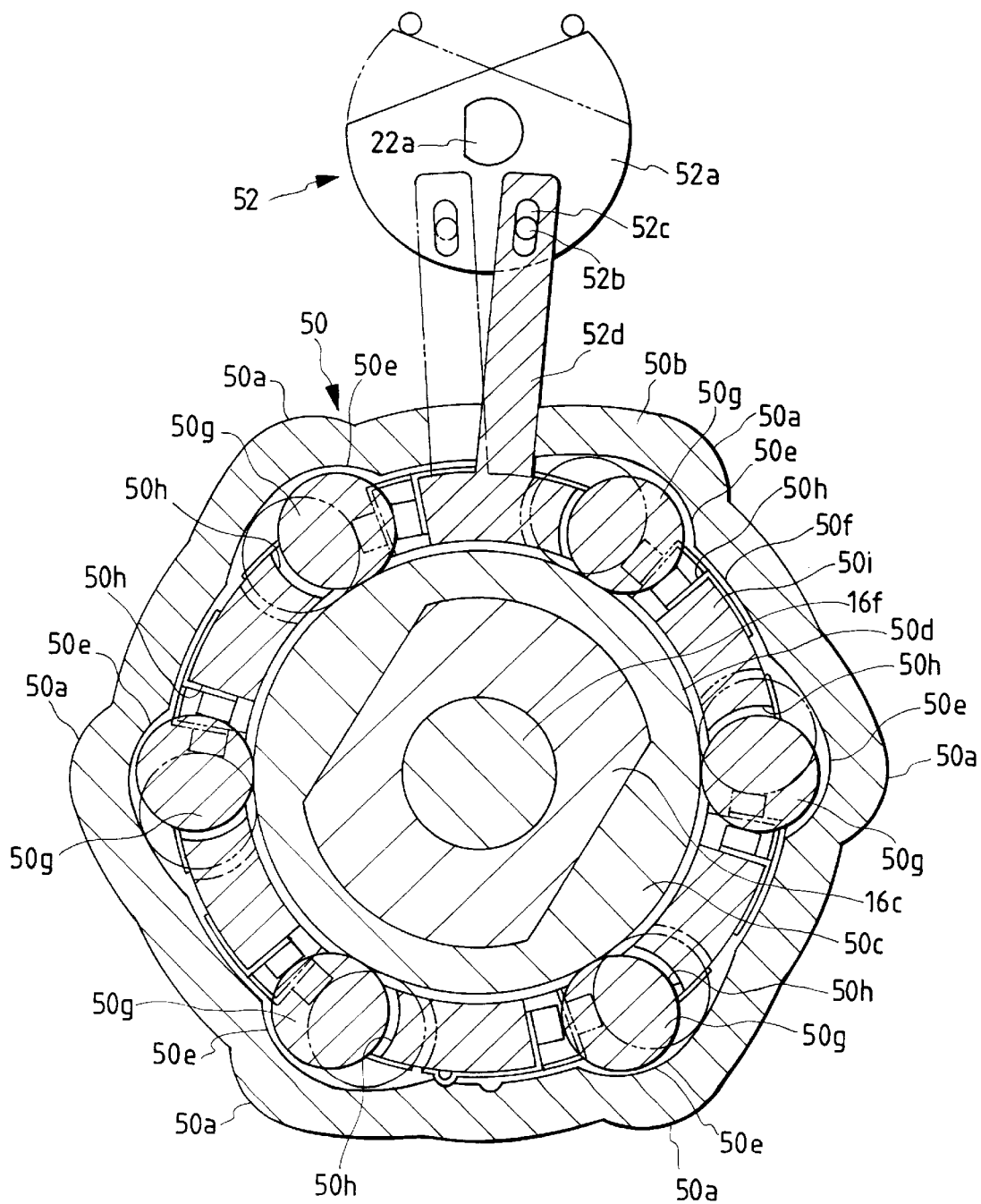
FIG. 10 is a schematic transverse sectional view of a reversal preventive mechanism and a reversal prevention switching mechanism that are the main parts of a spinning reel for fishing which is one of fishing reels according to a third embodiment of the invention.

Next, description will be given below of a spinning reel for fishing, which is one of fishing reels according to a third embodiment of the invention, with reference to FIG. 10. In particular, FIG. 10 is a schematic transverse section view of a reversal preventive mechanism and a reversal prevention switching mechanism which are respectively the main portions of a spinning reel for fishing which is one of fishing reels according to the third embodiment of the invention.

The basic structure of the fishing reel according to the third embodiment is similar to the basic structure of the spinning reel for fishing according to the first embodiment of the invention which has been previously described with reference to FIGS. 1 to 5.

The spinning reel for fishing, which is one of fishing reels according to the third embodiment of the invention, is different from the spinning reel for fishing according to the first embodiment of the invention which has been previously described with reference to FIGS. 1 to 5 in the structures of the reversal preventive mechanism and reversal prevention switching mechanism.

Now, description will be given below in detail of the reversal preventive mechanism and reversal prevention switching mechanism which are respectively the main portions of a spinning reel for fishing which is one of fishing reels according to the third embodiment of the invention with reference to FIG. 10. In FIG. 10, the same components as those employed in the first embodiment shown in FIGS. 1 to 5 are given the same designations and thus the detailed description thereof is omitted here.

The reversal preventive mechanism and reversal prevention switching mechanism according to the third embodiment, similarly to the reversal preventive mechanism 18 and reversal prevention switching mechanism 22 according to the first embodiment, is disposed in the front end face of the reel main body 12, in particular, in an area extending along the line III—III shown in FIG. 1.

The reversal preventive mechanism 50 according to the third embodiment comprises an outer wheel 50b, which includes a plurality of rotation preventive projections 50a on the outer peripheral surface thereof and is concentrically fixed to a spool shaft 16f in the front end face of the reel main body 12, and a collar member 50c concentrically fixed to a pinion gear 16c (see FIGS. 1 and 10) which is rotatably supported not only on the outer peripheral surface of the spool shaft 16f but also to the reel main body 12; and, the outer peripheral surface of the collar member 50c faces the inner peripheral surface of the outer wheel 50b in the radial direction of the spool shaft 16f and forms a circular-shaped clutch outer peripheral surface 50d disposed concentrically to the spool shaft 16f.

The above-mentioned inner peripheral surface of the outer wheel 50b is disposed concentrically to the spool shaft 16f and includes a plurality of cam recessed portions 50e spaced at regular intervals, thereby forming a cam groove 50f.

The plurality of cam recessed portions 50e respectively vary gradually in the depths of the bottom surfaces thereof in the peripheral direction of the above-mentioned inner peripheral surface; in particular, in the third embodiment, the bottom surface depths of the cam recessed portions 50e increase gradually as the positions thereof advance clockwise when viewed from the front end face of the reel main body 12 (that is, when viewed from the left side of FIG. 1).

On the clutch outer peripheral surface 50d of the collar member 50c of the pinion gear 16c, at positions which correspond to the respective deepest portions of the plurality of cam recessed portions 50e of the cam grooves 50f of the outer wheel 50b, there are disposed cam members 50g which respectively have diameters smaller than distances from their respective deepest portions to the clutch outer peripheral surface 50d of the collar member 50c. By the way, in the present embodiment, each cam member 50g is formed of a cylindrical-shaped roller. And, the diameters of the cam members 50g are respectively larger than distances from the respective shallowest portions of the plurality of cam recessed portions 50e of the cam groove 50f of the outer wheel 50b to the clutch outer peripheral surface 50d of the collar member 50c.

Therefore, the cam members 50g, as shown in FIG. 10, when they are situated in the respective deepest portions of the plurality of cam recessed portions 50e of the cam groove 50f of the outer wheel 50b, they are respectively free to rotate in such deepest portions; and, if the cam members 50g are moved along the clutch outer peripheral surface 50d of the collar member 50c of the pinion gear 16c from the respective deepest portions of the plurality of cam recessed portions 50e of the cam groove 50f of the outer wheel 50b to the respective shallowest portions thereof, then they are held by and between the respective bottom surfaces of the corresponding cam recessed portions and the clutch outer peripheral surface 50d.

That is, when the plurality of cam members 50g are held in the above-mentioned manner, the relative rotational movements of not only the collar member 50c but also the rotor 16e (see FIG. 1) through the pinion gear 16 toward the above-mentioned shallowest portions with respect to the outer wheel 50, namely, the reel main body 12 are prevented. On the other hand, when the plurality of cam members 50g are free to rotate as mentioned above, the free relative rotational movements of not only the collar member 50c but also the rotor 16e (see FIG. 1) through the pinion gear 16 are allowed. And, the rotational movement of the rotor 16e (see FIG. 1) through the pinion gear 16 toward the above-mentioned shallowest portions is the rotational movement of the rotor 16e (see FIG. 1) in the fishing line play-out direction.

And, in a gap between the clutch outer peripheral surface 50d of the collar member 50c of the pinion gear 16c and the cam groove 50f which provides the inner peripheral surface of the outer wheel 50b, there is interposed a cam member hold annular member 50i including a plurality of cam member hold holes 50h which are respectively used to hold the plurality of cam members 50g in a freely rotatably manner. Therefore, if the cam member hold annular member 50i is rotated clockwise when viewed from the front end face of the reel main body 12 (that is, when viewed from the left of FIG. 1), then the plurality of cam members 50g are all free to rotate in the respective shallowest portions of the corresponding cam recessed portions 50e, and thus a reversal allowable state, which allows the free relative rotational movements of not only the collar member 50c but also the rotor 16e (see FIG. 1) through the pinion gear 16 with respect to the outer wheel 50b, that is, the reel main body 12, is set in the reversal preventive mechanism 50. On the other hand, if the cam member hold annular member 50i is rotated counterclockwise when viewed from the front end face of the reel main body 12 (that is, when viewed from the left of FIG. 1), then the plurality of cam members 50g are all moved from the respective deepest portions of the corresponding cam recessed portions 50e toward the respective shallowest portions thereof and are thereby held in the above-mentioned manner, and thus a reversal preventive state, which prevents the free relative rotational movements of not only the collar member 50c but also the rotor 16e (see FIG. 1) through the pinion gear 16 with respect to the outer wheel 50b, that is, the reel main body 12, is set in the reversal preventive mechanism 50.

Also, the reversal prevention switching mechanism 52 according to the third embodiment, which is used to switch the reversal preventive mechanism 50 selectively between the above-mentioned reversal allowable state and reversal preventive state, similarly to the reversal prevention switching mechanism 22 according to the first embodiment previously described herein with reference to FIGS. 1 to 5, includes an operation lever 20 (see FIG. 1: operation part) projecting from the rear end face of the reel main body 12, and an operation rod 22a which extends from the operation lever 20 (see FIG. 1: operation part) up to the front end face of the reel main body 12 and also which, in the present front end face, projects out to the neighborhood of the reversal preventive mechanism 50. The reversal prevention switching mechanism 52 according to the third embodiment is different from the reversal prevention switching mechanism 22 according to the first embodiment in that, instead of the eccentric projection 22a provided in the reversal prevention switching mechanism 22 according to the first embodiment, a cam plate 52a is fixed to the projecting end portion of the operation rod 22a in the front end face of the reel main body 12.

And, an eccentric cam pin 52b is fixed to the cam plate 52a, in particular, to the position thereof eccentric to the operation rod 22a. The reversal prevention switching mechanism 52 further includes a reversal preventive mechanism operation lever 52d which is projected from the cam member hold annular member 50i and includes a long and narrow hole 52c connected to the eccentric cam pin 52b.

Therefore, the reversal prevention switching mechanism 52, by rotating the operation lever 20 (see FIG. 1: operation part) in one direction or in the other direction, not only can rotate the cam member hold annular member 50i of the reversal preventive mechanism 50 in one direction or in the other direction through the cam plate 52a, eccentric cam pin 52b and reversal preventive mechanism operation lever 52d, but also can set the reversal preventive state or reversal allowable state in the reversal preventive mechanism 50.

The positions of the cam plate 52a, eccentric cam pin 52b and reversal preventive mechanism operation lever 52d respectively shown by solid lines in FIG. 10, that is, the position of the operation lever 20 (see FIG. 1: operation part) is a reversal allowable position at which the plurality of cam members 50g of the reversal preventive mechanism 50 are all situated at their respective rotation allowable positions allowing them to be freely rotated in the respective deepest portions of their corresponding cam recessed portions 50e; and, the positions of the cam plate 52a, eccentric cam pin 52b and reversal preventive mechanism operation lever 52d respectively shown by two-dot chained lines in FIG. 10, that is, the position of the operation lever 20 (see FIG. 1: operation part) is a reversal preventive position at which the plurality of cam members 50g of the reversal preventive mechanism 50 are all situated at their respective reversal preventive positions where they are held in a reversal preventive manner after they are moved from the respective deepest portions of their corresponding cam recessed portions 50e to the shallowest portions thereof.

In the third embodiment as well, the reversal prevention switching mechanism 52, similarly to the previously described first embodiment, includes energizing means for energizing the operation lever 20 (see FIG. 1: operation part) to the reversal preventive position. And, the energizing means of the reversal prevention switching mechanism 52 according to the third embodiment, similarly to the previously described first embodiment, can be composed of a plate spring or a torsion coil spring, while a compression coil spring can also be used instead of the plate spring.

Also, the reversal preventive mechanism 50 according to the third embodiment can also be applied to the handle shaft 16 instead of the reversal preventive mechanism 30 according to the second embodiment. In this case, the reversal preventive mechanism operation lever 52*d*, which extends out from the cam member hold annular member 50*i* of the reversal preventive mechanism 50 according to the third embodiment and is part of the reversal prevention switching mechanism 52, is rotatably connected to the pressure projection 42*b* of the operation lever 42*a* which is part of the reversal prevention switching mechanism 42 according to the second embodiment, while the reversal preventive mechanism 50 can be operated by means of the operation lever 42*a*.

Fourth Embodiment

Next, description will be given below of a double bearing type reel for fishing which is one of fishing reels according to a fourth embodiment of the invention with reference to FIGS. 11(A) and (B). In particular, FIG. 11(A) is a longitudinal section view of one side wall of the double bearing type reel for fishing which is one of fishing reels according to a fourth embodiment of the invention, and FIG. 11(B) is a schematic horizontal section view taken along the line B—B shown in FIG. 11(A).

The present double bearing type reel for fishing includes a reel main body 60 which supports a spool (not shown) between a pair of side walls thereof in such a manner that the spool can be freely rotated. In the interior portion of one of the pair of side walls of the reel main body 60, there is incorporated a fishing line take-up drive mechanism 62 which transmits a rotational force input from a rotary handle 61 projecting from the outer surface of one of the pair of side walls of the reel main body 60 to the spool (not shown) to thereby drive the spool (not shown) so as to take up the fishing line thereon.

The spool (not shown) is concentrically fixed to a spool shaft 64 which is rotatably supported by one of the pair of side walls of the reel main body 60. The fishing line take-up drive mechanism 62 includes a handle shaft 62*a* to which the base end portion of the rotary handle 61 is fixed and also which is rotatably supported by one of the pair of side walls of the reel main body 60, and a known rotation force transmission mechanism and a known clutch mechanism 62*c* which, in one of the pair of side walls of the reel main body 60, are respectively interposed between the handle shaft 62*a* and spool shaft 64. The rotation force transmission mechanism is composed of a gear train, for example, an input gear 62*b*-1 concentrically fixed to the handle shaft 62 and a pinion 62*b*-2 which is concentrically and rotatably supported by the spool shaft 64 and is in meshing engagement with the input gear 62*b*-1. Also, the clutch mechanism 62*c*, when it is operated by a clutch operation lever 66 provided on the outer peripheral surface of the reel main body 60, reciprocates the pinion 62*b*-2 on the spool shaft 64 between a rotation force transmission position, at which the pinion 62*b*-2 is contacted and engaged with the spool (not shown), and a rotation force non-transmission position at which the pinion 62*b*-2 is detached from the spool (not shown) and is removed from the contact and engagement with the spool (not shown).

And, the clutch operation lever 66 can be set selectively between a clutch-off position shown by a solid line in FIG. 11(A) and a clutch-on position shown by a two-dot chained line in FIG. 11(B) by a switching spring 70 such as a coil spring provided between the above-mentioned one side wall of the reel main body 60 and a clutch drive plate 68 which can be rotated together with the clutch operation lever 66 in a given range along the periphery of the spool shaft 64.

A clutch plate 74, which is supported by a pair of guide pins 72 fixed to the above-mentioned one side wall of the reel main body 60 in parallel to the spool shaft 64 in such a manner that it can be moved along the spool shaft 64 together with the pinion 62*b*-2, is pressed against the clutch drive plate 68 by energizing means (not shown) wound around the pair of guide pins 72.

And, when the clutch operation lever 66 is set at the clutch-on position shown by the solid line in FIG. 11(A), the clutch drive plate 68 does not press the clutch plate 74 in a direction (in FIG. 11(A), in the upward direction thereof), in which the clutch plate 74 is moved away from the spool (not shown) together with the pinion 62*b*-2, against the energizing force of the energizing means (not shown), thereby allowing the contact and engagement between the pinion 62*b* and the spool (not shown). In this case, a rotation force in a given rotation direction (in FIG. 11(A), a counterclockwise direction), which is input from the handle 61 to the handle shaft 62*a*, is transmitted to the spool (not shown) through the input gear 62*b*-1 of the handle shaft 62*a* and the pinion 62*b*-2 of the spool shaft 64, thereby causing the spool (not shown) to rotate in the fishing line take-up direction.

Also, when the clutch operation lever 66 is set at the clutch-off position shown by the two-dot chained line in FIG. 11(A), the clutch drive plate 68 presses the clutch plate 74 in a direction (in FIG. 11(A), in the upward direction thereof), in which the clutch plate 74 is moved away from the spool (not shown) together with the pinion 62*b*-2, against the energizing force of the energizing means (not shown), thereby removing the contact and engagement between the pinion 62*b* and the spool (not shown). In this case, a rotation force in a given rotation direction (in FIG. 11(A), a counterclockwise direction), which is input from the handle 61 to the handle shaft 62*a*, is not transmitted to the spool (not shown) through the input gear 62*b*-1 of the handle shaft 62*a* and the pinion 62*b*-2 of the spool shaft 64, so that the spool (not shown) is free to rotate and thus it can be rotated in the fishing line play-out direction.

In the interior portion of the above-mentioned one side wall of the reel main body 60, there are further incorporated a reversal preventive mechanism 80 which can be selectively switched over between a reversal preventive state to prevent the reversal of the fishing line take-up drive mechanism 62 in the fishing line play-out direction and a reversal allowable state to allow the reversal of the fishing line take-up drive mechanism 62, and a reversal prevention switching mechanism 82 which, by operating an operation button (operation part) 82*a* which is so provided as to project from the above-mentioned one side wall of the reel main body 60, can switch the reversal preventive state and reversal allowable state of the reversal preventive mechanism 80 over to each other.

In the present embodiment, the reversal preventive mechanism 80 includes a ratchet wheel 80*b* concentrically fixed to the handle shaft 62*a*, and a securing click 80*c* which is disposed adjacent to the ratchet wheel 80*b* in the inner surface of the above-mentioned one side wall of the reel main body 60. The securing clock 80c can be freely rotated between an engaging position, at which one end portion thereof, as shown in FIG. 11(A), is engaged with the ratchet wheel 80b, and an engagement removal position at which the one end portion is detached from the ratchet wheel 80b and is thereby removed from the engagement with the ratchet wheel 80b; and, the engaging click 80c is energized toward the engaging position shown in FIG. 11(A) by energizing means (not shown) such as a torsion coil spring or the like.

The reversal prevention switching mechanism 82 includes an operation rod 82b which extends from the operation button (operation part) 82a up to the other end portion of the securing click 80c and, in the projecting end portion of the operation rod 82b, there is formed an inclined surface 82d which is opposed to the upper edge of the other end portion of the securing click 80c. The operation button (operation part) 82a is energized toward its projecting position by the energizing force of energizing means 82e such as a compression coil spring interposed between the operation button (operation part) 82a and the inner surface of the above-mentioned one side wall of the reel main body 60, while a stopper 82f fixed to the operation rod 82b prevents the operation button (operation part) 82a from flying out from the above-mentioned one side wall of the reel main body 60.

In the thus structured fourth embodiment of the invention, when the operation button (operation part) 82a is not pressed down while the clutch operation lever 66 is set at the clutch-on position shown by the solid line in FIG. 11(A), then the securing click 80c is being energized toward the engaging position shown in FIG. 11(A) by known energizing means (not shown) and the reversal preventive mechanism 80 is thereby held in the reversal preventive state.

Also, when the operation button (operation part) 82a is pressed down while the clutch operation lever 66 is set at the clutch-on position shown by the solid line in FIG. 11(A), then the inclined surface 82d of the projecting end portion of the operation rod 82b of the reversal prevention switching mechanism 82 is pressed against the upper edge of the other end portion of the securing click 80c to thereby cause the securing click 80c to rotate from the engaging position to the engagement removal position against the energizing force of the above-mentioned known energizing means (not shown). And, the reversal preventive mechanism 80 is thereby switched over to the reversal allowable state which allows the free rotation thereof including the reversal in the opposite direction (that is, in the fishing line play-out direction) to the fishing line take-up direction of the above-mentioned spool (not shown).

After then, if the pressure applied to the operation button (operation part) 82a is removed, then the operation button (operation part) 82a is automatically returned toward the projecting position shown in FIG. 11(B) by the energizing force of the energizing means 82e, which in turn removes the pressure that is applied to the upper edge of the other end portion of the securing click 80c by the inclined surface 82d of the projecting end portion of the operation rod 82b, so that the securing click 82c is allowed to return automatically from the engagement removal position to the engaging position due to the energizing force of the known energizing means (not shown). And, the reversal preventive mechanism 80 is thereby switched over to the reversal preventive state which prevents the reversal thereof in the opposite direction (that is, in the fishing line play-out direction) to the fishing line take-up direction of the above-mentioned spool (not shown).

That is, while the clutch operation lever 66 is set at the clutch-on position shown by the solid line in FIG. 11(A), during the time when the operation button (operation part) 82a is not operated (in the present embodiment, it is not pressed down), the reversal preventive mechanism 80 is held in the reversal preventive state; and, only when the operation button (operation part) 82a is operated (in the present embodiment, it is pressed down), the reversal preventive mechanism 80 can be switched from the reversal preventive state over to the reversal allowable state.

The above-mentioned function of the reversal prevention switching mechanism 82, which is performed while the clutch operation lever 66 is set at the clutch-on position shown by the solid line in FIG. 11(A), is referred to as an automatic reversal preventive function.

On the other hand, if the clutch operation lever 66 is moved to the clutch-on position shown by the two-dot chained line in FIG. 11(A) while the operation button (operation part) 82a is not operated (in the present embodiment, it is not pressed down), then the known clutch mechanism 62c sets a reversal allowable state which allows the free rotation of the above-mentioned spool (not shown) including the reversal thereof in the fishing line play-out direction opposite to the fishing line take-up direction while the reversal preventive mechanism 80 remains held at the reversal preventive state.

Also, if the clutch operation lever 66 is moved to the clutch-off position shown by the solid line in FIG. 11(A) while the operation button (operation part) 82a is not operated (in the present embodiment, it is not pressed down), then the known clutch mechanism 62c sets a reversal preventive state which prevents the free rotation of the above-mentioned spool (not shown) including the reversal thereof in the fishing line play-out direction opposite to the fishing line take-up direction while the selective reversal preventive mechanism 80 remains held at the reversal preventive state.

That is, the known clutch mechanism 62c functions as manual select means which is used to manually set the above-mentioned spool (not shown) selectively between the reversal allowable state and reversal preventive state while the selective reversal preventive mechanism 80 remains held at the reversal preventive state.

Fifth Embodiment

Next, description will be given below of a spinning reel for fishing which is one of fishing reels according to a fifth embodiment of the invention with reference to FIGS. 12 to 15.

Figure 12:
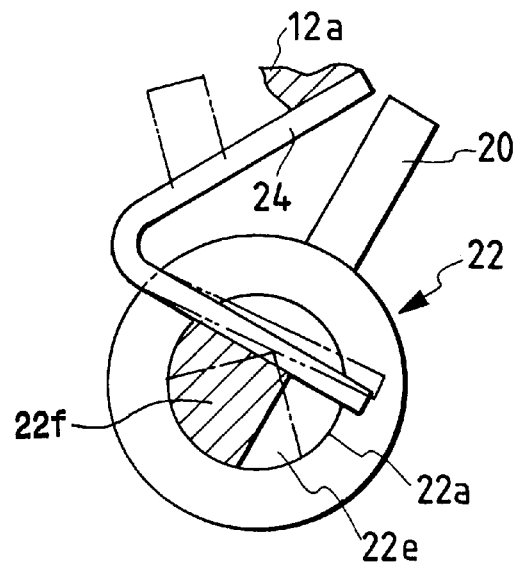
FIG. 12 is, similarly to FIG. 2, a transverse sectional view of an operation lever provided in a reversal prevention switching mechanism that is one of the main parts of a spinning reel for fishing which is one of fishing reels according to a fifth embodiment of the invention, showing a state when an automatic reversal preventive function is set.
Figure 13:
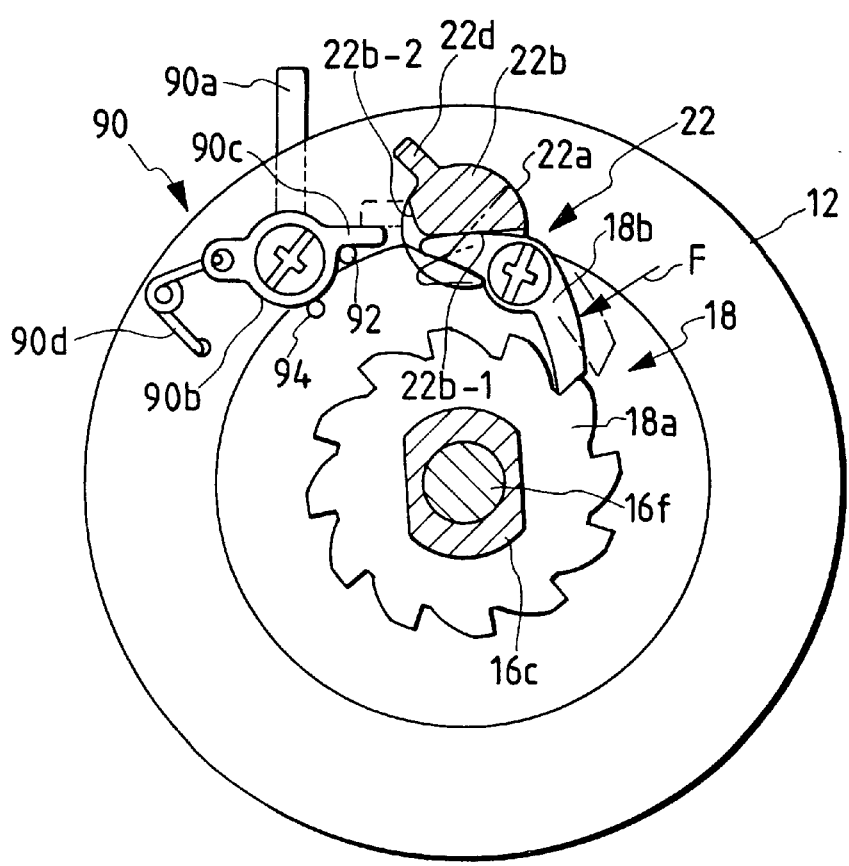
FIG. 13 is, similarly to FIG. 3, a transverse sectional view of part of the reversal prevention switching mechanism, a reversal preventive mechanism and manual select means that are the main parts of a spinning reel for fishing which is one of fishing reels according to a fifth embodiment of the invention, showing a state when the automatic reversal preventive function is set.

Here, FIG. 12 is similar to FIG. 2 and is a transverse section view of an operation lever provided in a reversal prevention switching mechanism which is a main part of a spinning reel for fishing which is one of fishing reels according to a fifth embodiment of the invention, showing a state in which an automatic reversal preventive function is set. Also, FIG. 13 is similar to FIG. 3 and is a transverse section view of part of an operation lever provided in a reversal prevention switching mechanism, a reversal preventive mechanism, and manual select means which are respectively main parts of a spinning reel for fishing which is one of fishing reels according to a fifth embodiment of the invention, showing a state in which an automatic reversal preventive function is set.

Figure 14:
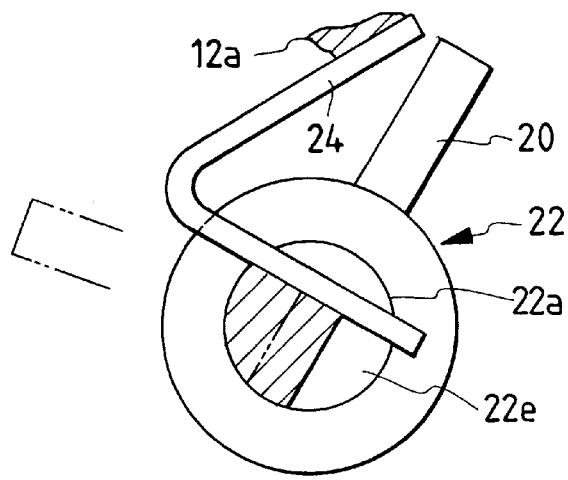
FIG. 14 is, similarly to FIG. 2, a transverse sectional view of the operation lever provided in the reversal prevention switching mechanism that is one of the main parts of a spinning reel for fishing which is one of fishing reels according to the fifth embodiment of the invention, showing a boundary state thereof between a state to set an automatic reversal preventive function and a state to set a manual reversal preventive function; and, FIG. 15 is, similarly to FIG. 3, a transverse sectional view of part of the reversal prevention switching mechanism, reversal preventive mechanism and manual select means that are the main parts of a spinning reel for fishing which is one of fishing reels according to a fifth embodiment of the invention, showing a state when the manual reversal preventive function is set.
Figure 15:
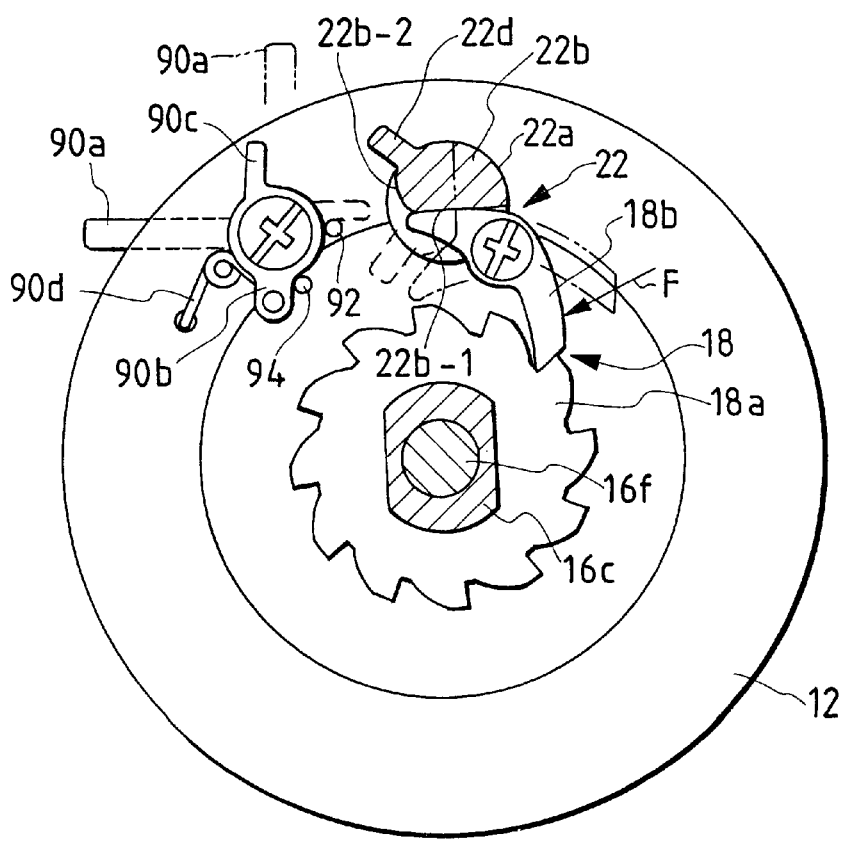

Further, FIG. 14 is similar to FIG. 2 and is a transverse section view of the operation lever provided in the reversal prevention switching mechanism which is a main part of a spinning reel for fishing which is one of fishing reels according to a fifth embodiment of the invention, showing a state in which the operation lever is held in the boundary position to set an automatic reversal preventive function and a manual reversal preventive function. And, FIG. 15 is a similar to FIG. 3 and is a transverse section view of part of the operation lever provided in the reversal prevention switching mechanism, reversal preventive mechanism, and manual select means which are respectively main parts of a spinning reel for fishing which is one of fishing reels according to a fifth embodiment of the invention, showing a state in which a manual reversal preventive function is set.

Most of the structure of the spinning reel for fishing which is one of fishing reels according to the fifth embodiment of the invention, with the main portions thereof shown in FIGS. 12 to 15, is the same as most of the structure of the spinning reel for fishing which is one of fishing reels according to the first embodiment of the invention that is shown in FIGS. 1 to 5. For this reason, in the structure of the spinning reel for fishing which is one of fishing reels according to the fifth embodiment of the invention, the same components as those of the spinning reel for fishing which is one of fishing reels according to the first embodiment of the invention that is shown in FIGS. 1 to 5 are given the same reference characters that designate the components of the spinning reel for fishing which is one of fishing reels according to the first embodiment of the invention that is shown in FIGS. 1 to 5, and thus the detailed description thereof is omitted here.

And, the structure of the spinning reel for fishing which is one of fishing reels according to the fifth embodiment of the invention, with the main portions thereof shown in FIGS. 12 to 15, is different from the structure of the spinning reel for fishing which is one of fishing reels according to the first embodiment of the invention shown in FIGS. 1 to 5 in not only part of the structure of the reversal prevention switching mechanism but also the existence of the manual select means that can be used in combination with part of the structure of the reversal prevention switching mechanism.

In the reversal prevention switching mechanism 22 of the spinning reel for fishing which is one of fishing reels according to the fifth embodiment of the invention, as shown in FIG. 13, an eccentric projection 22b, which is provided on the front end face of an operation rod 22a so provided as to project from the front end face of the reel main body 12, has a transverse section which is formed in a substantially fan-like shape having two sides different in length, while the longer side 22b-1 of the eccentric projection 22b is in contact with the other end portion of a securing click 18b held at its engaging position.

As shown in FIG. 13, a rotation distance control projection 22d is further provided on and projected from the front end face of an operation rod 22a so provided as to project from the front end face of the reel main body 12 in such a manner that the projection 22d projects in a direction to become more distant from the other end portion of the securing click 18b held at the engaging position.

The spinning reel for fishing which is one of fishing reels according to the fifth embodiment of the invention, as shown in FIG. 13, includes manual select means 90 which, in the reel main body 12, is disposed adjacent to the reversal prevention switching mechanism 22 and can be used in combination with the rotation distance control projection 22d of the reversal prevention switching mechanism 22.

The manual select means 90 includes an operation rod (not shown) which extends from the front end face of the reel main body 12 up to the rear end face thereof in parallel to the operation rod 22a of the reversal prevention switching mechanism 22. And, an operation lever 90a is fixed to the rear end portion of the above-mentioned operation rod (not shown) of the manual select means 90 projecting backwardly from the rear end face of the reel main body 12, while a rotation distance control cam 90b is fixed to the front end portion of the above-mentioned operation rod (not shown) of the manual select means 90 projecting forwardly from the front end face of the reel main body 12.

The rotation distance control cam 90b includes a rotation restrict projection 90c which projects from the outer peripheral surface thereof and, between the rotation distance control cam 90b and the front end face of the reel main body 12, there is interposed a switching spring 90d. In particular, the switching spring 90d is used to switch the rotation distance control cam 90b between an automatic reversal preventive position, at which the rotation restrict projection 90c, as shown in FIG. 13, is so disposed substantially horizontally as to move toward the eccentric projection 22b of the reversal prevention switching mechanism 22, and a manual select switching position which is distant by about 90 degrees of rotation counterclockwise from the automatic reversal preventive position shown in FIG. 13.

To the front end face of the reel main body 12, there are fixed a first stopper member 92 which is in contact with the lower edge of the rotation restrict projection 90c of the rotation distance control cam 90b held at the automatic reversal preventive position shown in FIG. 13, and a second stopper member 94 which is distant about 90 degrees from the first stopper member 92 substantially along the outer peripheral surface of the rotation distance control cam 90b in a clockwise direction opposite to the counterclockwise direction going from the automatic reversal preventive position shown in FIG. 13 to the manual select switching position.

Further, in the spinning reel for fishing which is one of fishing reels according to the fifth embodiment of the invention, as shown in FIG. 12, in the outer peripheral surface of the operation rod 22a of the reversal prevention switching mechanism 22, an engaging recessed portion 22e for receiving the other end portion of a substantially V-shaped plate spring 24 is formed in the neighborhood of the inner surface of the rear end wall of the reel main body 12; and, the transverse section shape of the engaging recessed portion 22e is formed as a shape in which a substantially triangular-shaped spring bearing 22f is left from a circular shape.

And, while, as shown by a solid line in FIG. 12, the other end portion of the plate spring 24 is in contact with the left side of the spring bearing 22f in the engaging recessed portion 22e formed in the outer peripheral surface of the operation rod 22a of the reversal prevention switching mechanism 22, the eccentric projection 22b of the reversal prevention switching mechanism 22, as shown in FIG. 13, is pressing the longer side 22b-1 against the other end portion of the securing click 18b held at the engaging position.

The rotation position of the operation lever 20 of the reversal prevention switching mechanism 22 at the then time is shown by a solid line in FIG. 12 and the present rotation position is the securing click operation removal position of the operation lever 20.

While the rotation distance control cam 90b of the manual select means 90 is being switched over to the automatic reversal preventive position shown in FIG. 13 by the switching spring 90d, if the operation lever 20 of the reversal prevention switching mechanism 22 is pressed down and is thereby rotated counterclockwise, when viewed from the front end face of the reel main body 12, from the securing click operation removal position thereof shown in FIG. 12, then the operation lever 20 can be rotated by a given angle up to a position shown by a two-dot chained line in FIG. 12 at which the rotation distance control projection 22d of the eccentric projection 22b on the front end face of the operation rod 22a collides with the rotation restrict projection 90c of the rotation distance control cam 90b being switched over to the automatic reversal preventive position as shown in FIG. 13.

In this operation, the vertex of the spring bearing 22f in the engaging recessed portion 22e of the operation rod 22a presses against the other end portion of the plate spring 24, so that the plate spring 24 enhances its energizing force to be applied to the spring bearing 22f in the engaging recessed portion 22e of the operation rod 22a.

In this case, the eccentric projection 22b on the front end face of the operation rod 22a applies pressure to the other end portion of the securing click 18b by means of the longer side 22b-1. As a result of this, the securing click 18b is rotated counterclockwise from the engaging position shown by the solid line in FIG. 13 against the energizing force F of the known energizing means (not shown) and, as shown by the two-dot chained line in FIG. 13, is then set at the engagement removal position at which the one end portion thereof is detached from the ratchet wheel 18a and the engagement thereof with the ratchet wheel 18a is thereby removed.

In consequence, the ratchet wheel 18a and securing click 18b of the reversal preventive mechanism 18 are set in the reversal allowable state which allows not only the reversal of the pinion gear 16c of the fishing line take-up drive mechanism 16 shown in FIG. 1 but also the free reversal of the rotor 16e mounted on the pinion gear 16c through the rotor support portion 16d in the fishing line play-out direction.

By the way, the then rotation position of the operation lever (operation part) 20 shown by the two-dot chained line in FIG. 12 is the securing click operation position of the operation lever (operation part) 20.

And, the rotational movement of the operation lever (operation part) 20 exceeding the securing click operation removal position shown by the solid line in FIG. 12 and the securing click operation position shown by the two-dot chained line in FIG. 12 is prevented by not only a rotation restrict projection (not shown) or a stepped portion (not shown) provided on the outer surface of the rear end wall of the reel main body 12 but also the first stopper member 92 in contact with the rotation distance control cam 90b of the manual select means 90 provided on the front end face of the reel main body 12.

If the above-mentioned application of the pressure to the operation lever (operation part) 20 is released, then the operation lever (operation part) 20 is automatically rotated by a given angle clockwise, when viewed from the front end face of the reel main body 12, to be returned up to the securing click operation removal position shown by the solid line in FIG. 12 from the securing click operation position shown by the two-dot chained line in FIG. 12, due to the energizing force of the plate spring 24 applied to the spring bearing 22f in the engaging recessed portion 22c of the operation rod 22a.

In this operation, the eccentric projection 22b provided on the front end face of the operation rod 22a is rotated by a given angle and is thus returned from an engagement operation position, at which the eccentric projection 22b applies pressure to the other end portion of the securing click 18b by means of the longer side 22b-1, to an engagement operation removal position at which, as shown in FIG. 13, the pressure to the other end portion of the securing click 18b by means of the longer side 22b-1 is removed. As a result of this, the securing click 18b is allowed to rotate and return automatically from the engagement removal position shown by the two-dot chained line in FIG. 13 up to the engaging position shown by the solid line in FIG. 13 due to the energizing force F of the energizing means (not shown), where the one end portion of the securing click 18b is engaged with the ratchet wheel 18a again.

In consequence, the ratchet wheel 18a and securing click 18b of the reversal preventive mechanism 18 are set in the reversal preventive state which prevents not only the reversal of the pinion gear 16c of the fishing line take-up drive mechanism 16 shown in FIG. 1 but also the free reversal of the rotor 16e mounted on the pinion gear 16c through the rotor support portion 16d in the fishing line play-out direction.

As can be clearly seen from the above detailed description with reference to FIGS. 12 and 13, the reversal prevention switching mechanism 22 is so structured as to be able to perform an automatic reversal preventive function: that is, when the rotation distance control cam 90b of the manual select means 90 is switched over to the automatic reversal preventive position shown in FIG. 13 by the switching spring 90d, while the operation lever (operation part) 20 is not operated, the reversal prevention switching mechanism 22 holds the reversal preventive mechanism 18 in the reversal preventive state and, only when the operation lever (operation part) 20 is operated, it can switch the reversal preventive mechanism 18 from the reversal preventive state over to the reversal allowable state.

As described above, while the reversal prevention switching mechanism 22 is performing its automatic reversal preventive function, independently of the operation of the operation lever (operation part) 20 of the reversal prevention switching mechanism 22, if the rotation distance control cam 90b of the manual select means 90 is rotated counterclockwise substantially 90 degrees from the automatic reversal preventive position shown in FIG. 13 and is thereby switched over to the manual select switching position shown in FIG. 15, then the rotation restrict projection 90c of the rotation distance control cam 90b, as shown in FIG. 15, is caused to face upwardly.

During this, if the operation lever 20 of the reversal prevention switching mechanism 22 is pressed down and is thereby rotated counterclockwise, when viewed from the front end face of the reel main body 12, from a securing click operation removal position shown by a solid line in FIG. 14, then the operation lever 20, as shown in FIG. 15, can rotate the rotation distance control projection 22d of the eccentric projection 22b on the front end face of the operation rod 22a by a given angle up to a position shown by a two-dot chained line in FIG. 14 without colliding it with the rotation restrict projection 90c of the rotation distance control cam 90b set at the manual select switching position.

By the way, during this rotation, while the left side of the spring bearing 22f in the engaging recessed portion 22e of the operation rod 22a is situated nearer to the other end portion of the plate spring 24 than the right side thereof, the energizing force of the other end portion of the plate spring 24 is energizing the operation lever 20 toward the securing click operation removal position shown by the solid line in FIG. 14; but, on the other hand, if the right side of the spring bearing 22f approaches nearer to the other end portion of the plate spring 24 than the left side thereof, then the energizing force of the other end portion of the plate spring 24 energizes the operation lever 20 from the securing click operation removal position shown by the solid line in FIG. 14 toward the position shown by the two-dot chained line in FIG. 14.

If the operation lever 20 is set at the position shown by the two-dot chained line in FIG. 14, then the other end portion of the plate spring 24 is seated on the right side of the spring bearing 22f in the engaging recessed portion 22e of the operation rod 22a.

At the then time, the eccentric projection 22b on the front end face of the operation rod 22a applies pressure to the other end portion of the securing click 18b by means of the shorter side 22b-2 thereof. As a result of this, the securing click 18b is rotated counterclockwise from its engaging position shown by a solid line in FIG. 15 against the energizing force F of the known energizing means (not shown) and is set at an engagement removal position at which, as shown by a two-dot chained line in FIG. 15, one end portion of the securing click 18b is detached from the ratchet wheel 18a and the engagement thereof with the ratchet wheel 18a is thereby removed.

In consequence, the ratchet wheel 18a and securing click 18b of the reversal preventive mechanism 18 are set in the reversal allowable state which allows not only the reversal of the pinion gear 16c of the fishing line take-up drive mechanism 16 shown in FIG. 1 but also the free reversal of the rotor 16e mounted on the pinion gear 16c through the rotor support portion 16d in the fishing line play-out direction.

By the way, the then rotation position of the operation lever (operation part) 20 shown by the two-dot chained line in FIG. 14 is the manual select securing click operation position of the operation lever (operation part) 20.

And, the rotational movement of the operation lever (operation part) 20, which exceeds the securing click operation removal position shown by the solid line in FIG. 14 and the manual select securing click operation position shown by the two-dot chained line in FIG. 14, is prevented by a rotation restrict projection (not shown) or a stepped portion (not shown) provided on the outer surface of the rear end wall of the reel main body 12.

Even when the above-mentioned application of the pressure to the operation lever (operation part) 20 is released, the operation lever (operation part) 20 is still left at the manual select securing click operation position shown by the two-dot chained line in FIG. 14 due to the energizing force applied by the plate spring 24 seated on the right side of the spring bearing 22f of the engaging recessed portion 22e of the operation rod 22a and thus the shorter side 22b-2 of the eccentric projection 22b of the operation rod 22a still continues to apply pressure to the other end portion of the securing click 18b, so that the securing click 18b still remains held at the engagement removal position shown by the two-dot chained line in FIG. 15 against the energizing force F of the known energizing means (not shown). And, not only the reversal of the pinion gear 16c of the fishing line take-up drive mechanism 16 shown in FIG. 1 but also the free reversal of the rotor 16e mounted on the pinion gear 16c through the rotor support portion 16d in the fishing line play-out direction are still allowed to continue.

To return the operation lever (operation part) 20 from the manual select securing click operation position shown by the two-dot chained line in FIG. 14 to the securing click operation removal position shown by the solid line in FIG. 14, the operation lever (operation part) 20 must be manually rotated from the manual select securing click operation position shown by the two-dot chained line in FIG. 14 to the securing click operation removal position shown by the solid line in FIG. 14.

By the way, during this rotation, while the right side of the spring bearing 22f in the engaging recessed portion 22e of the operation rod 22a is situated nearer to the other end portion of the plate spring 24 than the left side thereof, the energizing force of the other end portion of the plate spring 24 is energizing the operation lever 20 toward the manual select securing click operation removal position shown by the two-dot chained line in FIG. 14; but, on the other hand, if the left side of the spring bearing 22f approaches nearer to the other end portion of the plate spring 24 than the right side thereof, then the energizing force of the other end portion of the plate spring 24 energizes the operation lever 20 from the manual select securing click operation removal position shown by the two-dot chained line in FIG. 14 toward the securing click operation removal position shown by the solid chained line in FIG. 14.

If the operation lever 20 is returned to the securing click operation removal position shown by the solid line in FIG. 14, then the eccentric projection 22b on the front end face of the operation rod 22a is rotated by a given angle and is thereby returned from the engagement operation position, at which the eccentric projection 22b applies pressure to the other end portion of the securing click 18b by means of the shorter side 22b-1, to the engagement operation removal position at which, as shown in FIG. 15, the pressure applied to the other end portion of the securing click 18b by mean s of the shorter side 22b-1 is removed. As a result of this, the securing click 18b is allowed to rotate and return automatically from the engagement removal position shown by the two-dot chained line in FIG. 15 up to the engaging position shown by the solid line in FIG. 15 due to the energizing force F of the energizing means (not shown), where the one end portion of the securing click 18b is engaged with the ratchet wheel 18a again.

In consequence, the ratchet wheel 18a and securing click 18b of the reversal preventive mechanism 18 are set in the reversal preventive state which prevents not only the reversal of the pinion gear 16c of the fishing line take-up drive mechanism 16 shown in FIG. 1 but also the free reversal of the rotor 16e mounted on the pinion gear 16c through the rotor support portion 16d in the fishing line play-out direction.

As can be clearly seen from the above detailed description with reference to FIGS. 14 and 15, when the rotation distance control cam 90b of the manual select means 90 is switched over to the manual select switching position shown in FIG. 15 by the energizing force of the switching spring 90d, to switch the reversal preventive mechanism 18 between the reversal preventive state and reversal allowable state, the operation lever (operation part) 20 of the reversal prevention switching mechanism 22 must be manually switched over to the manual select securing click operation position shown by the two-dot chained line in FIG. 14 or to the securing click operation removal position shown by the solid line in FIG. 14; that is, the reversal prevention switching mechanism 22 carries out its manual select switching operation function.

In the above-mentioned various embodiments and modifications, the reversal preventive mechanisms 18, 40, 50 and 80 are respectively structured such that they can prevent the reversal of the pinion gear 16*c* for the rotor 16*e* and handle shaft 16*a*, 62*a* respectively included in the fishing line take-up drive mechanisms 16, 62. However, the reversal preventive mechanisms 18, 40, 50 and 80 can also be structured such that they can prevent selectively the reversal of the other members included in the fishing line take-up drive mechanisms 16, 62.

Effects of the Invention

As can be seen from the foregoing detailed description, with use of a fishing reel according to the invention, when, after the reversal preventive mechanism is switched from the reversal preventive state over to the reversal allowable state by means of operation of the operation part of the reversal prevention switching mechanism, it is forgotten that the reversal preventive mechanism is returned from the reversal allowable state back to the reversal preventive state through the operation of the operation part of the reversal prevention switching mechanism, or even when, because the fishing line is entangled around the operation part of the reversal prevention switching mechanism or because something is butted against the operation part, the operation part is switched from the reversal preventive state over to the reversal allowable state unexpectedly while the operator of the fishing reel does not notice it, the reversal allowable state of the reversal preventive mechanism is automatically switched over to the reversal preventive state, whereby, even when a fish catches a hook and the fishing line is thus pulled strongly by the fish, there is eliminated the possibilities that the spool or rotor can be rotated reversely at high speeds, the fishing line can be played out excessively to be thereby entangled, the handle of the fishing line take-up drive mechanism can be turned reversely to thereby damage the fingers of the operator of the fishing reel, or even when the operator of the fishing reel moves to other places in the fishing spot, there is eliminated the possibility that the hook, terminal tackles or fishing line can be entangled around rock, plants, or other person(s) so that the fishing line can be played out excessively and can be thereby entangled, or when the fishing line is played out naturally, there is eliminated a fear of enhancing the possibility that the hook, terminal tackles or fishing line can be entangled around rock, plants or other person(s).

What is claimed is:

1. A fishing reel comprising: a reel main body; a fishing line take-up drive mechanism disposed in the reel main body and, when a drive force is input therein, for driving a spool to take up a fishing line therearound; a reversal preventive mechanism disposed in the reel main body and switchable selectively between a reversal preventive state for preventing the reversal of the fishing line take-up drive mechanism in a fishing line play-out direction and a reversal allowable state for allowing the reversal of the fishing line take-up drive mechanism; and, a reversal prevention switching mechanism disposed in the reel main body, including an operation part, and, by operating the operation part, for switching said reversal preventive mechanism between the reversal preventive state and reversal allowable state, wherein said reversal prevention switching mechanism automatically switches said reversal preventive mechanism from said reversal allowable state to said reversal preventive state and holds said reversal preventive mechanism in said reversal preventive state while said operation part of said reversal prevention switching mechanism is not operated.

2. A fishing reel as set forth in claim 1, further including manual select means, wherein, while said reversal prevention switching mechanism automatically switches said reversal preventive mechanism to said reversal preventive state while said operation is not operated said manual select means, independently of the operation of said operation part of said reversal prevention switching mechanism, can switch said reversal preventive mechanism selectively between said reversal preventive state and said reversal allowable state.

3. The fishing reel according to claim 1, wherein said reversal preventive switching mechanism further comprises:

a spring engaging and biasing said operating part to a reversal preventive position, said spring being disposed between said reel main body and said operation part.

4. The fishing reel according to claim 3, wherein said spring comprises a substantially v-shaped plate spring interposed between an engaging projection formed on an inner surface of said reel main body and a substantially semicircular-shaped engaging recess formed in an outer peripheral surface of said operating part.

5. The fishing reel according to claim 3, wherein said spring comprises a torsion spring and said operating part includes and rotates about a rod portion thereof, said torsion spring being disposed on an outer peripheral surface of said rod portion of said operating part, said torsion spring having a first end secured to an engaging projection formed on an inner surface of said reel main body and a second end secured to an engaging projection formed said outer peripheral surface of said rod portion of said operating part.

6. The fishing reel according to claim 3, wherein said operating part is supported in a linear reciprocating matter within a guide hole formed in a rear end wall of said reel main body, said spring including a substantially v-shaped plate spring member interposed between a lower end face of said operating part and an engaging projection formed in an inner surface of said reel main body.

* * * * *